United States Patent
Gupta et al.

(10) Patent No.: US 12,190,039 B1
(45) Date of Patent: Jan. 7, 2025

(54) INCREMENTAL CLOCK TREE PLANNING

(71) Applicant: Synopsys, Inc., Mountain View, CA (US)

(72) Inventors: Prashant Gupta, Karnataka (IN); Shibaji Banerjee, Karnataka (IN); Suhasini Rege, Karnataka (IN)

(73) Assignee: SYNOPSYS, INC., Sunnyvale, CA (US)

( * ) Notice: Subject to any disclaimer, the term of this patent is extended or adjusted under 35 U.S.C. 154(b) by 455 days.

(21) Appl. No.: 17/673,516

(22) Filed: Feb. 16, 2022

(51) Int. Cl.
  *G06F 30/396* (2020.01)
  *G06F 30/392* (2020.01)
  *G06F 111/04* (2020.01)

(52) U.S. Cl.
  CPC .......... *G06F 30/396* (2020.01); *G06F 30/392* (2020.01); *G06F 2111/04* (2020.01)

(58) Field of Classification Search
  USPC .................. 716/110, 118, 119, 122, 126
  See application file for complete search history.

(56) References Cited

U.S. PATENT DOCUMENTS

| | | | |
|---|---|---|---|
| 9,135,375 B1 * | 9/2015 | Sood | G06F 30/00 |
| 10,796,066 B1 * | 10/2020 | Farshidi | G06F 30/3312 |
| 2009/0228844 A1 * | 9/2009 | Mak | G06F 30/396 |
| | | | 716/132 |

* cited by examiner

*Primary Examiner* — Brian Ngo
(74) *Attorney, Agent, or Firm* — Lewis Roca Rothgerber Christie LLP

(57) ABSTRACT

A method includes: receiving an integrated circuit design including a plurality of sub-circuits and one or more clocks to be distributed to the sub-circuits; setting one or more constraints on generating a clock network for a selected clock of the one or more clocks of the integrated circuit design; building, by a processor, a clock tree graph for the clock network for the selected clock based on a cached initial clock tree graph stored in a memory connected to the processor, the clock tree graph comprising nodes corresponding to the sub-circuits; generating a pin topology for the clock network based on the clock tree graph and the integrated circuit design; and placing, based on the pin topology, one or more pins for the clock network at one or more sides of the sub-circuits within the integrated circuit design to generate a pin placement for the clock network.

20 Claims, 9 Drawing Sheets

INCREMENTAL CLOCK TREE PLANNING

TECHNICAL FIELD

The present disclosure generally relates to an electronic design automation (EDA) system. In particular, the present disclosure relates to a system and method for providing incremental clock tree planning.

BACKGROUND

In an integrated circuit, a clock signal oscillates between a high logic state and a low logic state. A clock signal is typically used in an integrated circuit to synchronize the actions of circuit elements, such as where digital logic may take actions at the rising edge, falling edge, or both the rising and falling edges of the clock signal. Many integrated circuit designs include multiple clocks, which may operate at different frequencies or which may operate for different purposes, such as standard operation versus test.

Clock signals are typically distributed to the various sub-circuits within an integrated circuit through a clock network, which typically has a tree structure in which a central clock source generates signals that propagate through multiple branches to reach the sub-circuits.

Some aspects of electronic design automation systems in the field of integrated circuits are directed to the routing of the clock network to distribute the clock signals to various sub-circuits in a manner that satisfies design constraints such as timing requirements.

SUMMARY

According to one embodiment of the present disclosure, a method includes: receiving an integrated circuit design including a plurality of sub-circuits and one or more clocks to be distributed to the sub-circuits; setting one or more constraints on generating a clock network for a selected clock of the one or more clocks of the integrated circuit design; building, by a processor, a clock tree graph for the clock network for the selected clock based on a cached initial clock tree graph stored in a memory connected to the processor, the clock tree graph comprising a plurality of nodes corresponding to the sub-circuits of the integrated circuit design; generating a pin topology for the clock network based on the clock tree graph and the integrated circuit design; and placing, based on the pin topology, one or more pins for the clock network at one or more sides of the sub-circuits within the integrated circuit design to generate a pin placement for the clock network.

The method may further include computing a full clock tree pin-placement on the integrated circuit design, including: computing an initial clock tree graph for the one or more clocks of the integrated circuit design and storing the initial clock tree graph as the cached initial clock tree graph in the memory; computing an initial pin topology for the one or more clocks of the integrated circuit design and storing the initial pin topology as a cached pin topology in the memory; and computing an initial pin placement for the one or more clocks of the integrated circuit design and storing the initial pin placement as a cached pin placement in the memory.

The method may further include storing the pin topology and the pin placement generated for the clock network in the memory.

The method may further include detecting an existing pin placement in the integrated circuit design based on the cached pin placement stored in the memory; and removing the existing pin placement from the integrated circuit design based on the cached pin placement stored in the memory.

The one or more clocks of the integrated circuit design may include a first clock and a second clock, the memory may store a cached initial first clock tree graph and a cached initial second clock tree graph, the setting the one or more constraints on generating the clock network for the selected clock of the one or more clocks of the integrated circuit design may include: selecting the first clock as the selected clock and setting the second clock as unselected, and the building the clock tree graph for the clock network for the selected clock may include: building a first clock tree graph corresponding to the first clock based on the cached initial first clock tree graph.

The building the clock tree graph for the clock network for the selected clock may include building the first clock tree graph corresponding to the first clock without building a second clock tree graph corresponding to the second clock.

The generating the pin topology for the clock network may include generating a first pin topology for a first clock network corresponding to the first clock without generating a second pin topology for a second clock network corresponding to the second clock, and the placing the one or more pins for the clock network may include placing one or more first pins for the first clock network corresponding to the first clock without placing one or more second pins for the second clock network corresponding to the second clock.

The method may further include: setting one or more second constraints on generating a second clock network for the second clock of the one or more clocks of the integrated circuit design; selecting the second clock as the selected clock and setting the first clock as unselected; and building, by the processor, a second clock tree graph for the second clock network for the second clock based on the cached initial second clock tree graph, without rebuilding the first clock tree graph.

The method may further include: generating a second pin topology for the second clock network without generating a first pin topology for a first clock network; and placing one or more second pins for the second clock network without placing one or more first pins for the first clock network.

According to one embodiment of the present disclosure, a system includes: a memory storing instructions; and a processor, coupled with the memory and to execute the instructions, the instructions when executed cause the processor to: set one or more constraints on generating a clock network for a selected clock of the one or more clocks of an integrated circuit design including a plurality of sub-circuits, wherein the clock network distributes the one or more clocks to the sub-circuits; build a clock tree graph for the clock network for the selected clock based on a cached initial clock tree graph stored in the memory, the clock tree graph comprising a plurality of nodes corresponding to the sub-circuits of the integrated circuit design; detect an existing pin placement in the integrated circuit design based on a cached pin placement stored in the memory; remove the existing pin placement from the integrated circuit design based on the cached pin placement stored in the memory; generate a pin topology for the clock network based on the clock tree graph and the integrated circuit design; and place, based on the pin topology, one or more pins for the clock network at one or more sides of the sub-circuits within the integrated circuit design to generate a pin placement for the clock network.

The memory may further store instructions that, when executed cause the processor to compute a full clock tree pin-placement on the integrated circuit design, including:

computing an initial clock tree graph for the one or more clocks of the integrated circuit design and storing the initial clock tree graph as the cached initial clock tree graph in the memory; and computing an initial pin placement for the one or more clocks of the integrated circuit design and storing the initial pin placement as the cached pin placement in the memory.

The memory may further store instructions that, when executed cause the processor to: computing an initial pin topology for the one or more clocks of the integrated circuit design and storing the initial pin topology as a cached pin topology in the memory.

The one or more clocks of the integrated circuit design may include a first clock and a second clock, the memory may store a cached initial first clock tree graph and a cached initial second clock tree graph, the instructions to generate the clock network for the selected clock of the one or more clocks of the integrated circuit design may include instructions that when executed cause the processor to: select the first clock as the selected clock and setting the second clock as unselected, and the instructions to build the clock tree graph for the selected clock may include instructions that when executed cause the processor to: build a first clock tree graph corresponding to the first clock based on the cached initial first clock tree graph.

The instructions to generate the pin topology for the clock network may include instructions that when executed cause the processor to generate a first pin topology for a first clock network corresponding to the first clock without generating a second pin topology for a second clock network corresponding to the second clock, and the instructions to place the one or more pins for the clock network may include instructions that when executed cause the processor to place one or more first pins for the first clock network corresponding to the first clock without placing one or more second pins for the second clock network corresponding to the second clock.

The memory may further store instructions that, when executed cause the processor to: set one or more second constraints on generating a second clock network for the second clock of the one or more clocks of the integrated circuit design; select the second clock as the selected clock and setting the first clock as unselected; build a second clock tree graph for the second clock network for the second clock based on the cached initial second clock tree graph, without rebuilding the first clock tree graph; generate a second pin topology for the second clock network without generating a first pin topology for the a first clock network; and place one or more second pins for the second clock network without placing one or more first pins for the first clock network.

According to one embodiment of the present disclosure, a non-transitory computer readable medium includes stored instructions, which when executed by a processor, cause the processor to: set one or more constraints on generating a clock network for a selected clock of one or more clocks of an integrated circuit design including a plurality of sub-circuits, wherein the clock network distributes the one or more clocks to the sub-circuits; build a clock tree graph for the clock network for the selected clock based on a cached initial clock tree graph stored in memory connected to the processor, the clock tree graph comprising a plurality of nodes corresponding to the sub-circuits of the integrated circuit design; remove an existing pin placement from the integrated circuit design based on a cached pin placement stored in the memory; generate a pin topology for the clock network based on the clock tree graph and the integrated circuit design; and place, based on the pin topology, one or more pins for the clock network at one or more sides of the sub-circuits within the integrated circuit design to generate a pin placement for the clock network.

The non-transitory computer readable medium may further include stored instructions, which when executed by the processor, cause the processor to compute a full clock tree pin-placement on the integrated circuit design, including: computing an initial clock tree graph for the one or more clocks of the integrated circuit design and storing the initial clock tree graph as the cached initial clock tree graph in the memory; computing an initial pin topology for the one or more clocks of the integrated circuit design and storing the initial pin topology as a cached pin topology in the memory; and computing an initial pin placement for the one or more clocks of the integrated circuit design and storing the initial pin placement as a cached pin placement in the memory.

The non-transitory computer readable medium may further include stored instructions, which when executed by the processor, cause the processor to: detect an existing pin placement in the integrated circuit design based on the cached pin placement stored in the memory.

The non-transitory computer readable medium may further include stored instructions, which when executed by the processor, cause the processor to: store a cached initial first clock tree graph and a cached initial second clock tree graph in the memory, the instructions to generate the clock network for the selected clock of the one or more clocks of the integrated circuit design may include instructions that when executed cause the processor to: select a first clock among the one or more clocks of the integrated circuit design as the selected clock and setting a second clock among the one or more clocks of the integrated circuit design as unselected, and the instructions to build the clock tree graph for the selected clock may include instructions that when executed cause the processor to: build a first clock tree graph corresponding to the first clock based on the cached initial first clock tree graph, the instructions to generate the pin topology for the clock network includes instructions that when executed cause the processor to: generate a first pin topology for a first clock network corresponding to the first clock, and wherein the instructions to place the one or more pins for the clock network include instructions that when executed cause the processor to: place one or more first pins for the first clock network corresponding to the first clock.

The non-transitory computer readable medium may further include stored instructions, which when executed by the processor, cause the processor to: set one or more second constraints on generating a second clock network for the second clock of the one or more clocks of the integrated circuit design; select the second clock as the selected clock and setting the first clock as unselected; build a second clock tree graph for the second clock network for the second clock based on the cached initial second clock tree graph, without rebuilding the first clock tree graph; generate a second pin topology for the second clock network without regenerating the first pin topology for the first clock network; and place one or more second pins for the second clock network without re-placing the one or more first pins for the first clock network.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
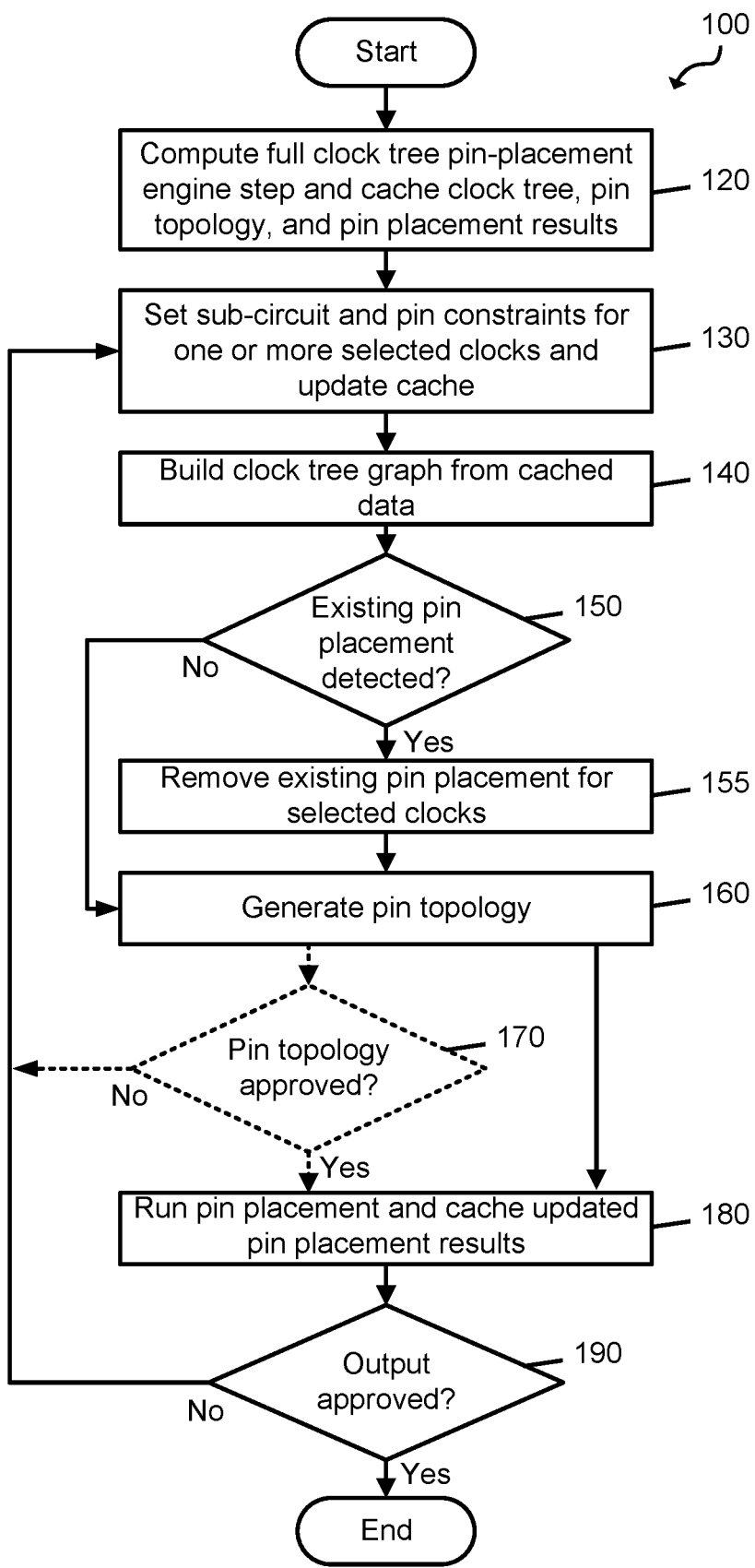
FIG. 1 is a flowchart of a method for performing incremental clock tree planning, driven by clock tree synthesis, according to one embodiment of the present disclosure.

Aspects of the present disclosure relate to incremental clock tree planning.

In an integrated circuit, a clock signal is typically used to synchronize the actions of circuit elements. A clock signal controls the timing of digital logic gates to take actions in time with the clock signal, which is typically a signal that alternates between a low voltage and a high voltage. The transition from the low voltage to the high voltage is referred to as a rising edge of the clock signal, and the transition from the high voltage to the low voltage is referred to as a falling edge of the clock signal. Many integrated circuit designs include multiple clock signals, which may operate at different frequencies or which may operate for specialized purposes, such as for testing the circuit rather than for normal operations.

A clock source generates clock signals and transmits the signals through the wires of the integrated circuit to arrive at different sub-circuits or clock sinks. The integrated circuit also typically includes buffer amplifiers (also referred to as buffers) and/or inverters to amplify the clock signals as they travel to sub-circuits. Because the clock signals do not travel instantaneously and because the buffer amplifiers within the paths also cause delays, there is a difference between the time at which a clock signal is generated at the clock source (e.g., the time of a rising edge of the clock signal) and the time at which the clock signal arrives at a clock sink (e.g., the time at which the rising edge at the clock sink). This time difference is referred to as a clock tree insertion delay, and generally depends on the number of buffers along the path (this delay may be referred to a gate delay) and the length of the wire (this delay may be referred to as a wire delay) between the clock source and the clock sink. These delays may also vary based on process, temperature, and voltage conditions.

In addition, the same clock signal may arrive at different sub-circuits or components or clock sinks at different times. These differences in arrival time are also primarily caused by differences in the number of buffers and the lengths of the wires in the paths from the clock source to the different clock sinks. The difference in arrival times at different clock sinks is referred to as a clock skew, and can limit the degree to which the activities of the different sub-circuits can be synchronized. Because some clock skew is unavoidable, circuits are designed with budget (or tolerance) for timing differences. However, if the actual clock skew exceeds this budget, then the circuit may not function correctly at its designed speed (e.g., may need to operate at a lower clock rate) or might not function at all.

As an example, a clock source may generate a clock signal (e.g., a transition from low voltage to high voltage) starting at time 0. The clock signal may arrive at a first clock sink 2.71 nanoseconds (ns) later. The same clock signal from the clock source may also arrive at a second clock sink 2.86 ns later, because the wire from the clock source to the second clock sink is longer than the wire from the clock source to the first clock sink. Therefore, the first clock sink has a clock tree insertion delay of 2.71 ns and the second clock sink has a clock tree insertion delay of 2.86 ns. The clock skew between the first clock sink and the second clock sink is 2.86 ns-2.71 ns=0.15 ns.

Clock tree synthesis (CTS) refers to generating a physical design for distributing clock signals from one or more clock sources to sub-circuits within an integrated circuit, where the clock tree synthesis process generally aims to minimize clock skew and clock tree insertion delay, subject to some design constraints set by an engineer. For example, a clock tree synthesis method may attempt to have the same number of buffers in all of the paths from the clock source to each clock sink and to also keep the total length of the wires along each of the paths to be as close to equal as possible, without violating other design requirements of the circuit (e.g., routing the wires through areas of the integrated circuit reserved for other functions).

In the design planning (DP) workflow for designing integrated circuits, large designs (e.g., full circuits or larger portions of circuits) are partitioned into smaller sub-designs (e.g., sub-circuits), where these sub-designs are designed and optimized independently (see, e.g., 522 in FIG. 5 and FIG. 6, described in more detail below). An integrated circuit design may be represented as a netlist, which may have a graph structure in which edges of the graph structure represent components of a circuit and where the nodes of the graph structure represent how the components are interconnected. During design planning (DP), an overall floor plan for the integrated circuit is constructed and analyzed for timing and top-level routing. Partitioning designs in this way significantly reduces engineering resource requirements and design cycle time because, for example, separate engineering teams can design and optimize separate sub-designs to perform within with agreed-upon specifications, and the separate sub-designs can later be integrated into larger integrated circuit designs. Budgeting is one step in the DP flow that involves assigning accurate timing constraints to the sub-designs so that the sub-designs are neither over-constrained nor under-constrained.

In the design planning workflow, the system (or design) of interest (e.g., the integrated circuit being designed) has a netlist which specifies the placement of cells or sub-circuits within the larger integrated circuit design. At this stage of the workflow, the data paths are not yet implemented (e.g., not yet optimized) and the clock signals are assumed to operate in an ideal mode (e.g., no clock skew). In order to perform the budgeting, a static timing system predicts the timing of signals in the design, which may include accounting for delays, transitions, load, and the like. Ideally, the predicted timing of the signals in the design correlates well with the timing of those signals in later stages of the design, after developing more of the details of the integrated circuit, such as post-physical optimization.

During design planning, data path timing is typically estimated and/or predicted by virtual optimization engines implemented by a processor executing instructions to estimate path timing virtually (e.g., by estimating buffered net delay without changing the netlist) and the post-physical optimization clock latency is predicted by a clock tree planning (CTP) engine implemented by a processor executing instructions. A clock tree planning (CTP) solution computed by a CTP engine plans the clock distribution in hierarchical integrated circuit designs and therefore provides the design planning process with clock tree awareness (e.g., information about the structure of clock tree network) when clocks are ideal. As such, the CTP engine generates estimated latency information (e.g., clock tree insertion delay and clock skew). A budgeter or budgeting method implemented by a processor executing instructions uses the estimated latency values from the CTP engine along with estimated data path timing from the virtual optimization engines to generate an efficient (timing) budget for the design.

In addition to estimating the post-physical clock latency of the clock network (e.g., clock tree), the CTP engine also computes the optimal locations of existing clock pins and newly created feedthrough pins or ports. These clock pins refer to electrical connections at the edges of sub-circuits where clock signals are supplied into the sub-circuit and feedthrough pins (or feedthrough ports) refer to electrical connections for passing a clock signal through the sub-circuit (e.g., entering through a bottom edge of the sub-circuit and exiting through a top edge of the circuit so that the clock signal can be supplied to another sub-circuit on the opposite side).

Many integrated circuit designs include multiple clocks or multiple clock signals, where different clocks have different operating frequencies and may have different priorities (for example, functional clocks are more important than test clocks in the designs). Therefore, during the clock planning stage, important clocks need to be distributed more carefully (e.g., minimizing insertion delay and clock skew of higher-priority clocks is given more weight than minimizing the insertion delay and clock skew of lower-priority clocks). Optimizing the distribution of important clocks reduces the clock latency and skew of those important clocks, which improves the performance of the resulting design, at least because reducing clock latency and clock skew improves the maximum operating frequency of the design.

To achieve this goal, during the design process, engineers typically set constraints on the clock tree synthesis, such as specifying whether or not clock signals can pass through particular sub-circuits within the design and/or which sides of the sub-circuits the clock signals can enter and exit (e.g., assuming the sub-circuits have a rectangular shape). After setting these constraints, a full clock tree planning (CTP) pin placer engine implemented by a processor executing instructions attempts to generate a pin topology (which defines which sides of the sub-circuits the pins enter and exit from) and creates/places pins (specifying locations of the clock pins or ports on sub-circuits on the sides of the sub-circuits specified by the pin topology) to complete the clock distribution. In more detail, pin topology specifies how nets are connected in a design, such as how nets enter and exit sub-circuits. The CTP engine generates the pin topology by considering clock parameters such as skew, latency, and any additional user-provided constraints. A pin placer creates and place pins to complete the distribution of the network, where the pin placer may use pin topology information to guide the pin placement (such that the pin placement also accounts for the clock parameters and other constraints that controlled the pin topology). The engineer then evaluates the output of the pin-placer engine to determine if the generated pin placement is satisfactory. If not, then the user restarts the process modifies the constraints, and runs the CTP pin placer engine again based on the modified constraints. In a sense, engineers may be thought of as using the CTP engine to search through the space of constraints to find a pin placement solution that exhibits timing characteristics that meet the design requirements.

The engineer may choose to run the CTP engine on all the clocks or just a subset of the clocks. Generally, to generate a good (or optimal) clock distribution or clock network for all high priority clocks, an engineer first runs the CTP engine for all clocks present in the design, which generates pin topology and creates/places pins for all clock networks in the design. The engineer may then run the CTP engine separately on the higher priority clocks in order to fine tune the results. Based on the pin topology and pin placement results from the CTP engine, the engineer evaluates the current performance of the clock network (e.g., timing performance) and, if the results are not yet satisfactory, repeats the process of modifying constraints related to, for example, the placement of pins on sub-circuits and/or other routing constraints based on the sub-circuits and re-runs the CTP engine on the updated constraints. The process of updating constraints and running the CTP engine on the updated constraints generally repeats until the CTP engine generates satisfactory (or optimal) results within the engineering constraints (e.g., engineering resources available at this particular phase of the design).

Each run of the CTP pin placer engine is very computationally intensive process (e.g., having significant time and energy costs). This significantly impacts the overall turnaround time (TAT) for each iteration (e.g., each time the engineer tries a new set of constraints to direct the CTP pin placer engine to find a good solution), and an engineer typically runs through multiple iterations to try to find a good or optimal pin topology for the clock signals, and may require the user to manually remove pin placement results before starting a new iteration. In addition, even minor changes in the design or timing constraints (e.g., the data path) may require the user to re-run the full CTP pin placer engine, thereby further significantly increasing costs in both computing time and engineering time.

Therefore, a CTP engine that computes good locations and that generates good results (e.g., low clock skew) reduces number of design iterations that must be performed by a design engineer and therefore shortens the turnaround time (TAT) of the design process. Automating the clock tree planning flow reduces the overall effort of users (e.g., engineers). This also helps to achieve timing closure (e.g., a design that meets the timing constraints to operate correctly at the designed clock frequency) with significantly reduced computing time and engineering effort.

Accordingly, embodiments of the present disclosure relate to an incremental clock tree planning pin-placer engine. The present incremental CTP pin-placer engine performs iterations of the pin placement process more quickly than a typical full CTP pin-placer engine, and therefore computes an optimal or good pin topology (e.g., the same pin topology that would be computed by a typical full CTP pin-placer engine to reduce the latency and/or skew of clock networks such as clock trees) in less time and with fewer resources consumed.

In some aspects of embodiments, the present incremental CTP pin-placer engine computes results more quickly than a typical full CTP pin-placer engine by caching and re-using results from one or more earlier runs of the CTP pin-placer engine (e.g., a first round using a full CTP pin-placer engine). In some embodiments, these cached data include routing and pin placement data for clock signals as computed in previous iterations, and in some embodiments, these cached data are automatically updated when the present incremental CTP pin-placer engine computes new pin placement data for one or more pins.

The present incremental CTP pin-placer engine according to various embodiments can be run on all clocks or a subset of clocks in the system, and may be run on different clocks during different iterations, and also allows fast turnaround even when minor changes are made to the design or timing constraints.

In some aspects of embodiments, the present incremental CTP pin-placer engine shortens the turnaround time by automatically removing the previous pin placements results from previous runs of the CTP pin placer engine, thereby saving engineers from the time consuming, tedious, and potentially error-prone step of manually removing previous pin placement results from a modified netlist. In some embodiments, the removal of previous pin placement results is limited to selected clock networks whose pin placements will be recomputed in a current iteration (e.g., when a current iteration is limited to one or more selected clocks, then only pin placements associated with selected clock networks are removed).

Accordingly, an incremental clock tree planning pin-placer engine according to embodiments of the present disclosure reduces the number of design iterations to compute accurate budgets (e.g., timing budgets), thereby reducing the overall turnaround time of designing an integrated circuit. These approaches also significantly reduce the computational resources (e.g., computation time and electrical energy) and effort required to achieve the timing closure in the design of the integrated circuit.

In more detail, a typical full pin-placer engine of a clock tree planner performs a full clock tree synthesis step to build a full clock tree graph during every design iteration. Clock tree synthesis is a technique typically used in a later stage in the workflow for the design, verification, and fabrication of an integrated circuit (see, e.g., FIG. 5). However, software tools for clock tree synthesis are also useful in the design planning stage, which occurs earlier in the workflow, where the output of a clock tree synthesis engine helps in producing more accurate timing estimates for clock tree planning. In more detail, in some approaches to clock tree planning, an engineer sets sub-circuit and/or pin constraints on the clock tree and runs a clock tree synthesis step to synthesize a clock tree based on those constraints. In typical approaches, the clock tree synthesis tool performs a full clock tree synthesis process during each iteration of the clock tree planning process.

However, several steps performed by a typical full clock tree synthesis process depend primarily on the underlying design (e.g., the input netlist) and may generally remain the same from one iteration to the next. For example, running a full clock tree synthesis typically includes: clock tree relocation; clock buffer removal; and gate characterization.

Clock tree relocation refers to relocating clock tree cells before clock tree synthesis to optimize clock latency. However, clock tree relocation generally needs to be performed only once for any given input design for any given subset of the same clocks in the design, and therefore it is not necessary to perform clock tree relocation during every iteration (e.g., the computed locations of the clock tree cells is generally the same from one iteration to the next during clock tree planning).

Clock buffer removal refers to removing existing buffers and inverters in the clock trees before performing clock tree synthesis. However, once the buffers and inverters have been removed from the input design, it is not necessary to redo this step (e.g., the version of the netlist with the buffers and inverter removed can be cached for the clock tree planning process).

Gate characterization refers to estimating delay, slew, load, operating voltage, input pin capacitance, and the like for each clock buffer or clock inverter cell in the library, where the estimated values may be stored in a lookup table or other cache. This allows the correct clock inverter or clock buffer cell to be selected during clock tree synthesis. However, once these estimates are computed, it is not necessary to repeat the steps for each subset of the same clocks.

Based on empirical measurements, approximately 40% of run time during a clock tree synthesis (CTS) driven full pin-placer engine of a clock tree planning (CTP) process is spent performing clock tree relocation, clock buffer removal, and gate characterization. While these steps must be performed at least once during a CTS-driven CTP process, it is not necessary to perform clock tree relocation, clock buffer removal, and gate characterization during each iteration. Instead, because these values generally stay the same from one iteration to the next, aspects of embodiments of the present disclosure relate to caching these results such that later iterations may make use of the cached results (combined with other dynamically built data) to build an initial clock tree graph, to generate a pin topology for the given clocks based on the current constraints and to run the pin-placer engine to create/place pins, thereby reducing runtime by about 40%.

The initial clock tree graph generated by a typical full CTP engine and the present incremental CTP engine according to embodiments of the present disclosure are the same under the same clock constraints and timing constraints. Thus, the pin topology generated by a typical full CTP engine and the present incremental CTP engine according to embodiments of the present disclosure are the same under the same constraints (e.g., clock, pin, circuit block or sub-circuit, clock tree planning, and/or timing constraints). Embodiments of the present disclosure also perform an incremental step to handle minor changes in data path design and/or timing constraints without forcing a lengthy and computationally expensive (e.g., energy intensive) re-computation of values such as the initial clock tree.

FIG. 1 is a flowchart of a method 100 for performing incremental clock tree planning, driven by clock tree synthesis, according to one embodiment of the present disclosure. According to some embodiments, the method 100 is performed by a computer system, such as a computer system described below with respect to FIG. 7. The computer system may take, as input to method 100 a description of an integrated circuit design, such as represented as a post-placement netlist including a plurality of sub-circuits or circuit blocks.

At 120, the computer system computes a full clock tree synthesis (CTS) driven clock tree pin placement step, which computes an initial clock tree graph, a full clock tree graph, an initial pin topology, and pin placement results, which the computer system stores in a connected memory such as dynamic memory or persistent storage (e.g., the computer system caches data computed during the full CTS driven clock tree pin placement) for use later in the present incremental clock tree planning method 100. In some comparative approaches, the initial clock tree graph is an intermediate result of the CTS process that is not cached or stored because, for example, the CTS step is expected to be run only a single time and therefore there is no need to reuse the initial clock tree graph.

Figure 2A:
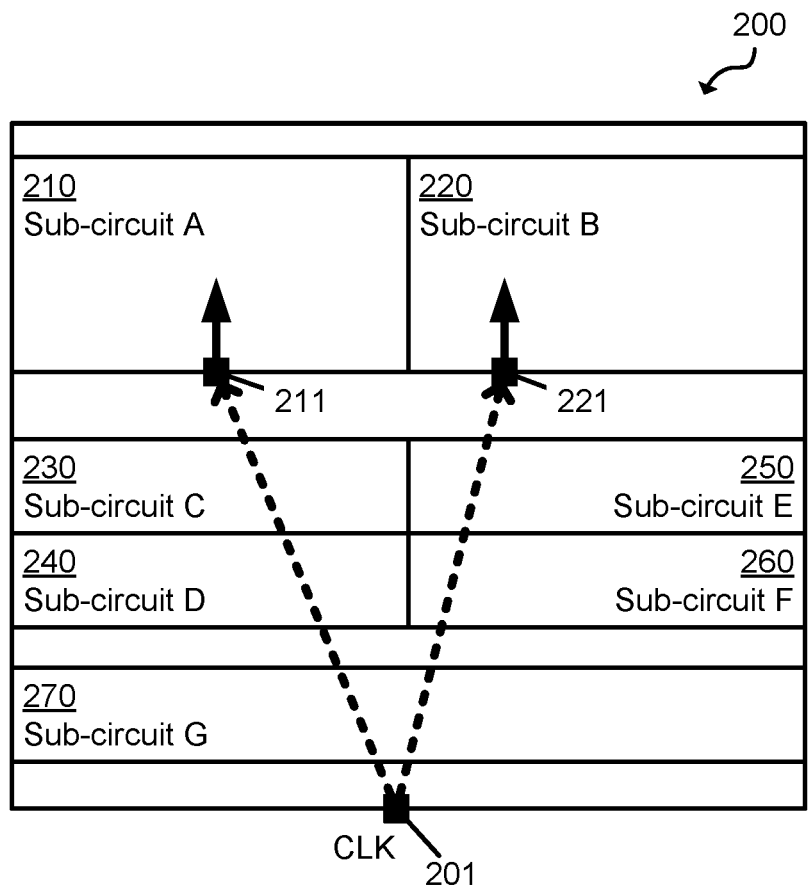
FIG. 2A is a schematic diagram illustrating an input design of an integrated circuit and constraints to the present incremental clock tree planning system, according to one embodiment of the present disclosure.

FIG. 2A is a schematic diagram illustrating an input design of an integrated circuit to the present incremental clock tree planning system, according to one embodiment of the present disclosure. As shown in FIG. 2A, an input design 200 (e.g., a full integrated circuit or a sub-circuit of a larger design) includes a first sub-circuit 210 (sub-circuit A) and a second sub-circuit 220 (sub-circuit B). The initial design specifies that an input clock CLK is supplied at a clock input port 201 and that this clock is to be distributed to the first sub-circuit 210 at a first clock pin 211 and to the second sub-circuit 220 at a second clock pin 221.

Figure 2B:
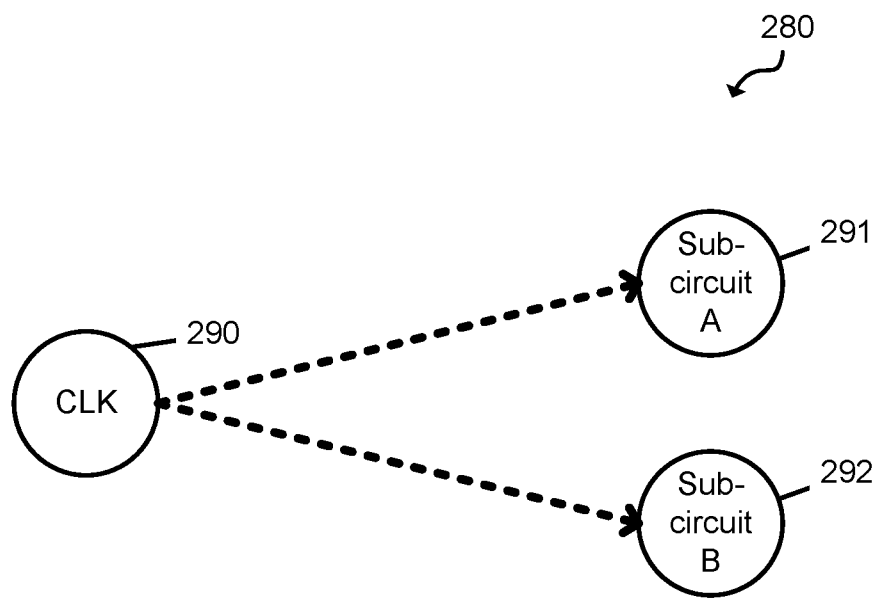
FIG. 2B is an initial clock tree graph corresponding to the input design shown in FIG. 2A, according to one embodiment of the present disclosure.

FIG. 2B is an initial clock tree graph 280 corresponding to the input design shown in FIG. 2A. As shown in FIG. 2B, the clock signal 290 is to be supplied to the first sub-circuit (sub-circuit A) 291 and to the second sub-circuit (sub-circuit B) 292.

While the input design shown in FIG. 2A and the resulting initial clock tree graph shown in FIG. 2B are relatively simple, in most practical designs, there are a large number of sub-circuits and potentially multiple clocks such that many clock tree graphs frequently include millions of nodes, and therefore formation of the initial clock tree graph is typically a computationally expensive process requiring significant expenditure of computing resources, including significant computing time (e.g., tens of minutes to hours of run time, depending on the complexity of the design) and electrical energy. In addition, due to the complexity of many typical integrated circuit designs, it would be impractical or impossible for a human to memorize or write down the initial clock tree graph, and would be impractical and impossible to manually recreate the initial clock tree graph during each iteration of an iterative clock tree planning process, where these clock trees have millions of nodes.

Referring back to FIG. 1, during the full clock tree synthesis driven clock tree pin placement at 120, the computing device computes a pin topology and pin placements for distributing the clock signals to the sub-circuits specified in the input.

As seen in FIG. 2A, the initial design specified that input clock CLK supplied at a clock input port 201 is to be distributed to the first sub-circuit 210 at first clock pin 211 and to the second sub-circuit 220 at second clock pin 221. Furthermore, third sub-circuit 230 (sub-circuit C), fourth sub-circuit 240 (sub-circuit D), fifth sub-circuit 250 (sub-circuit E), sixth sub-circuit 260 (sub-circuit F), and seventh sub-circuit 270 (sub-circuit G) are located between the clock signal and the first sub-circuit 210 and the second sub-circuit 220. As such, the clock tree carrying the clock signal CLK from the clock input port 201 to the first sub-circuit 210 and the second sub-circuit 220 must pass through one or more of the intervening sub-circuits.

Figure 2C:
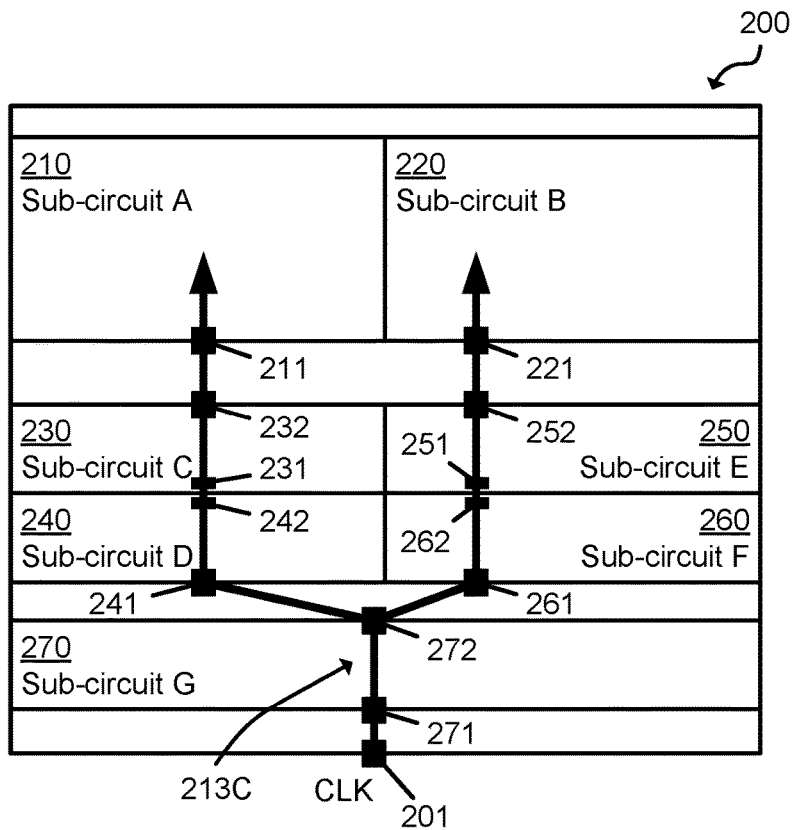
FIG. 2C is a schematic diagram illustrating a design of an integrated circuit including clock pin placements after performing an initial full CTP engine run in the present incremental clock tree planning system, according to one embodiment of the present disclosure.

FIG. 2C is a schematic diagram illustrating a design of an integrated circuit including clock pin placements after performing an initial full CTP engine run in the present incremental clock tree planning system according to one embodiment of the present disclosure. As shown in FIC. 2C, the initial full CTP engine run computes the initial clock tree graph (shown in FIG. 2B), a full clock tree graph (shown in FIG. 2D), and pin topology and pin placements for a clock network 213C that connects the clock input port 201 to the first clock pin 211 of the first sub-circuit 210 and the second clock pin 221 of the second sub-circuit 220.

In particular, the full CTP engine places feedthrough pins 271 and 272 at opposite sides of seventh sub-circuit 270 for the clock network 213C to pass through from the bottom side of seventh sub-circuit 270 at bottom pin 271 to a top pin 272 at the top-side of the seventh sub-circuit 270. (Here, "top," "bottom," "left," and "right" are used to refer to the various sides of sub-circuits or circuit blocks as shown in a plan view in the figures and are not intended to be limited to any particular absolute orientation of the layout of the design.) The clock tree branches at pin 272 to connect to a bottom feedthrough pin 241 of the fourth sub-circuit 240 and to a bottom feedthrough pin 261 of the sixth sub-circuit 260.

The branch of the clock network 213C passing through the fourth sub-circuit 240 exits the fourth sub-circuit 240 through a top feedthrough pin 242 and enters the third sub-circuit 230 via a bottom feedthrough pin 231 of the third sub-circuit 230. The clock network 213C exits the third sub-circuit at top feedthrough pin 232 and enters the first sub-circuit 210 at first clock pin 211.

Likewise, the branch of the clock network 213C passing through the sixth sub-circuit 260 exits the sixth sub-circuit 260 through a top feedthrough pin 262 and enters fifth sub-circuit 250 via a bottom feedthrough pin 251 of the fifth sub-circuit 250. The clock network 213C exits the fifth sub-circuit at top feedthrough pin 252 and enters the second sub-circuit 220 at second clock pin 221. Accordingly, by placing the feedthrough pins, the first clock pin 211, and the second clock pin 221, the full CTP engine generates a clock network 213C that completes the connection from the clock input port 201 (the clock root) to the first sub-circuit 210 and second sub-circuit 220 (the clock sinks).

Figure 2D:
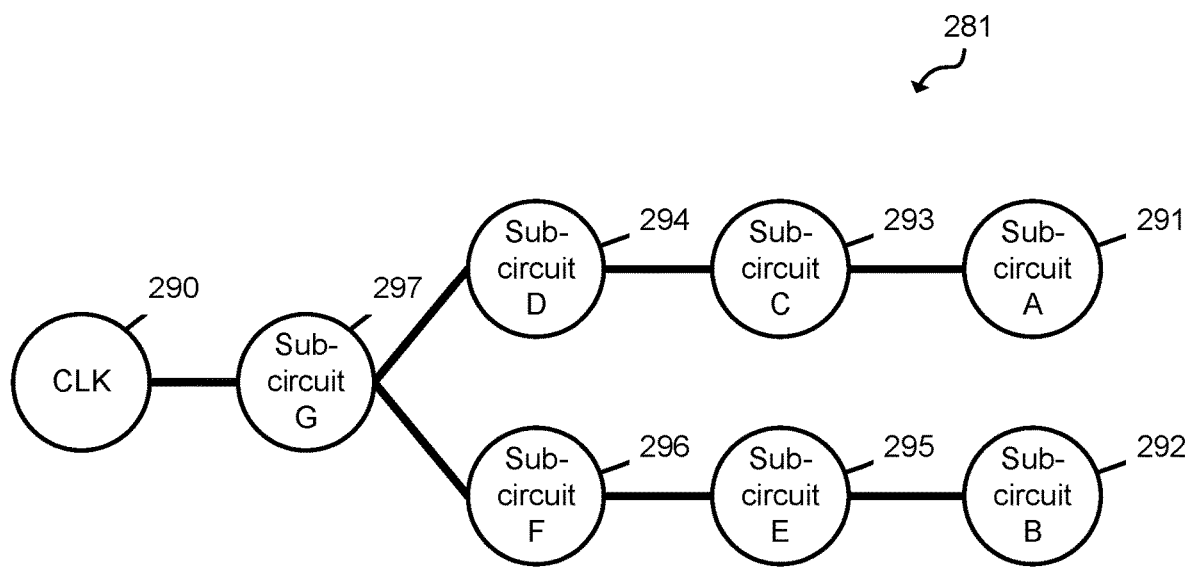
FIG. 2D is a clock tree graph corresponding to the design after the initial full CTP engine run shown in FIG. 2C, according to one embodiment of the present disclosure.

FIG. 2D is a clock tree graph 281 corresponding to the design after the initial full CTP engine run shown in FIG. 2C. As shown in FIG. 2D, the full clock tree graph 281 includes nodes between the root node 290 and the leaf nodes 291 and 292, where the leaf nodes identify the sub-circuits that the clock tree passes through to reach various leaf nodes. As such, the clock tree graph 281 includes a seventh node 297 connected directly to the root node 291. The clock tree graph 281 branches when exiting the seventh node 297 to connect to fourth node 294 and sixth node 296. The fourth node 294, in turn, is connected to third node 293, which is connected to first node 291, thereby corresponding to the connections shown in the left branch of the clock network 213C of FIG. 2C. Likewise, the sixth node 296 is connected to fifth node 295, which is connected to second node 292, thereby corresponding to the connections shown in the right branch of the clock network 213C of FIG. 2C.

The present incremental CTP engine according to some aspects of embodiments of the present disclosure builds a clock tree graph such as that shown in FIG. 2D for selected clocks (one or more selected clock signals or corresponding selected clock networks) starting from an initial clock tree graph (e.g., as shown in FIG. 2B) that was computed in a full CTP run (e.g., as performed at 120) and cached for use by the present incremental CTP engine. This avoids a computationally-expensive approach of rebuilding the initial clock tree graph from the input design (e.g., an input netlist) during each iteration of the iterative CTP process.

In more detail, at 130 of FIG. 1, the computer system sets sub-circuit and pin/block constraints (e.g., based on inputs from an engineer or set automatically based on some criteria, such as by following heuristics to allow or disallow clocks to pass through particular sub-circuits) for the one or more selected clocks and updates the cache based on these updated constraints. These sub-circuits (or circuit blocks) and pin constraints may specify, for example, which sub-circuits the clock network can pass through (and which sub-circuits the clock network cannot pass through) as well as which sides or particular portions of sides of the sub-circuits the clock network can pass through (e.g., constraining the placement of pins to particular portions of particular sides of a sub-circuit). The clocks may be selected by an engineer or user of the present incremental CTP system, and/or may be automatically selected by the processor based on priority (e.g., starting with incremental CTP runs to generate clock trees and place pins for higher priority clocks and proceeding with incremental CTP runs for lower priority clocks after completing the clock tree synthesis and pin placement of clock networks for higher priority clocks until incremental CTP runs have been performed for all of the clocks in the design, where the priorities of different clocks may be set based on frequency and functionality, e.g., higher frequency clocks have higher priority than lower frequency clocks and test clocks have lower priority than functional clocks), and the selected clocks for any given iteration may include any subset of all of the clocks in the design (including selecting all of the clocks in the design).

At 140, the computer system runs the present incremental CTP engine to build a clock tree graph for the selected clocks based on the cached data, e.g., a netlist with a clock tree relocated and buffers removed, estimated gate characterization values of buffer and inverter library cells, the cached initial clock tree, any previous cached pin topology, cached pin placement results, and the like. These cached data may have been computed during the initial full CTP run at 120 and/or the cached data may have been updated based on one or more incremental runs performed during iterations of the present incremental CTP process (e.g., updated or modified data computed during incremental runs).

Figure 2E:
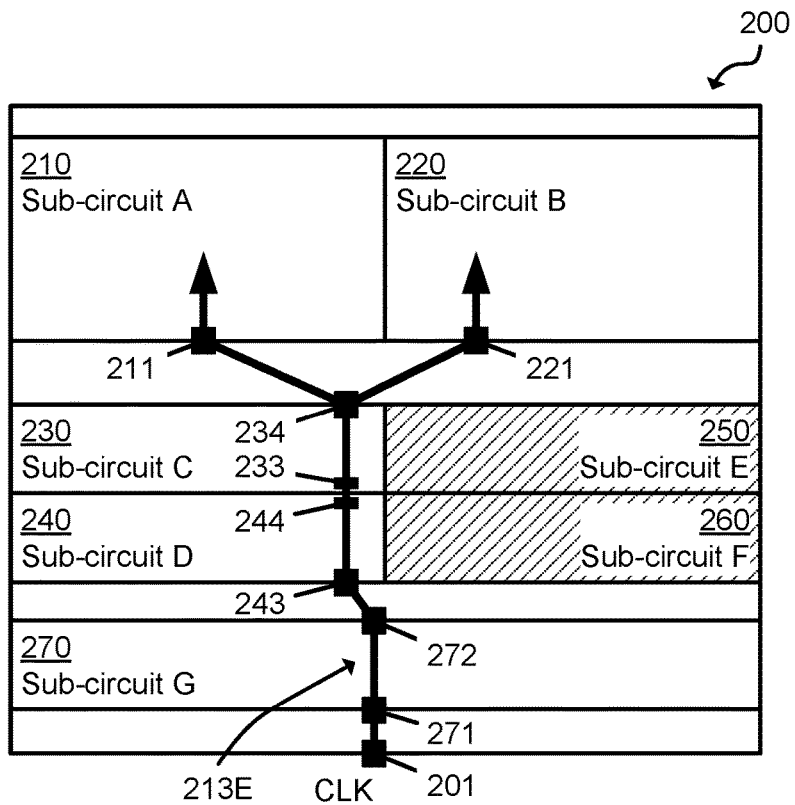
FIG. 2E is a schematic diagram illustrating a design of an integrated circuit including clock pin placements after setting constraints and performing an incremental CTP engine run in the present incremental clock tree planning system, according to one embodiment of the present disclosure.
Figure 2F:
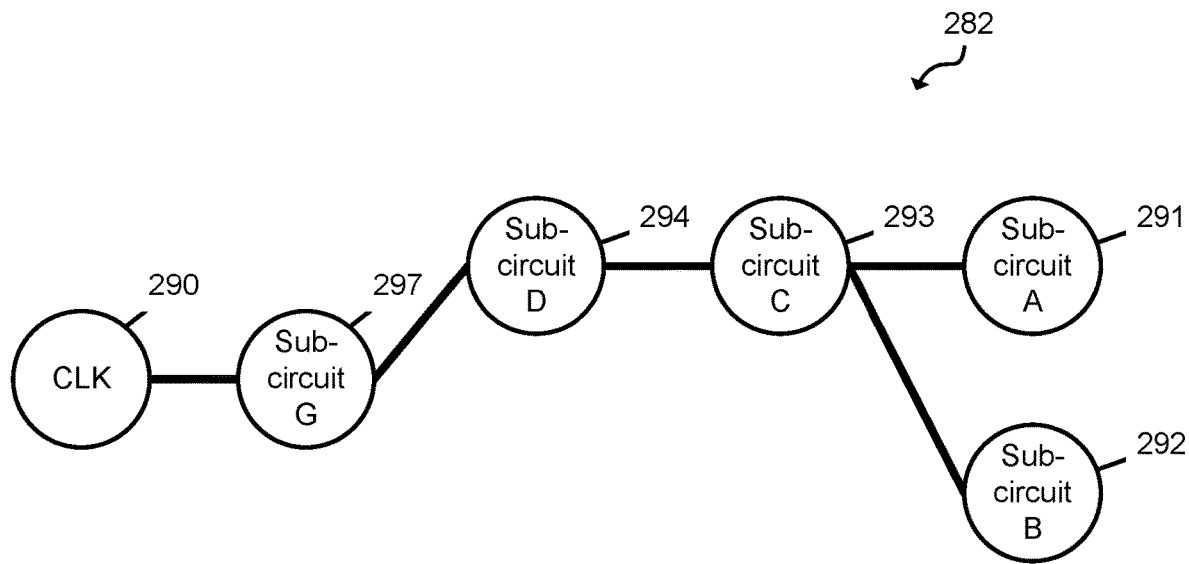
FIG. 2F is a clock tree graph corresponding to the design after the incremental CTP engine run shown in FIG. 2E, according to one embodiment of the present disclosure.

FIG. 2E is a schematic diagram illustrating a design of an integrated circuit including clock pin placements after setting constraints and performing an incremental CTP engine run in the present incremental clock tree planning system according to one embodiment of the present disclosure. FIG. 2F is a clock tree graph corresponding to the design after the present incremental CTP engine run shown in FIG. 2E.

In the arrangement shown in FIG. 2E, at 130 of FIG. 1, constraints were set in order to prevent the clock network from passing through the fifth sub-circuit 250 (sub-circuit E) and from passing through the sixth sub-circuit 260 (sub-circuit F), as shown by the shading of the fifth sub-circuit 250 and the sixth sub-circuit 260. At 140, the computer system computes a new clock tree graph based on the cached initial clock tree. In this case, the initial clock tree graph (e.g., FIG. 2B) is already computed in accordance with embodiments of the present disclosure, there is no need to re-compute the initial clock tree graph at 140. Instead, the computer system loads the cached initial clock tree graph and uses this initial clock tree graph as a starting point for computing a full clock tree graph 282 based on the constraints associated with the current iteration, as shown in FIG. 2F.

Further, as shown in FIG. 2E and FIG. 2F, an updated clock network 213E, based on the constraints, now passes through fourth sub-circuit 240 and third sub-circuit 230 by way of a bottom feedthrough pin 243 and a top feedthrough pin 244 of the fourth sub-circuit 240, and a bottom feedthrough pin 233 and a top feedthrough pin 234 of the third sub-circuit 230. At the top feedthrough pin 234 of third sub-circuit 230, the updated clock network 213E branches to connect to the first clock pin 211 of the first sub-circuit 210 and the second clock pin 221 of the second sub-circuit 220.

Accordingly, some aspects of embodiments of the present disclosure relate to caching data computed during a clock tree synthesis step (e.g., during an earlier full clock tree synthesis step or updated based on an earlier incremental clock tree synthesis step), and using the cached initial clock tree graph to compute a new clock tree graph in accordance with a new set of constraints (e.g., constraints supplied by an engineer). This use of cached data avoids the re-computation of data during each iteration, as performed in some typical approaches to clock tree synthesis driven clock tree planning, because the clock tree synthesis procedures were originally designed for use in later stages, where the CTS procedure was expected to be run only once, and therefore there was no need to cache the intermediate results, such as the initial clock tree graph, computed during the full clock tree synthesis.

As noted above, in a typical workflow for iterative clock tree planning, an engineer manually identifies and removes all feedthrough pins that were added to a design (e.g., added to a netlist) during a previous iteration of the clock tree planning process and also manually un-place all the clock pins and/or ports for the selected clocks so that the pin-placer step can be run again to place the pins and ports for the selected clocks in the netlist based on an updated set of constraints (e.g., pin, sub-circuit or circuit block, and/or other clock tree planning constraints, such as constraining which sub-circuits and which portions of sub-circuits the clock network can pass through and where pins can be placed on various sides of the sub-circuits).

As such, some aspects of embodiments relate to automatically detecting a previous pin placement relating to one or more selected clocks that are being updated, automatically removing the feedthrough pins associated with the generated clock networks and un-placing all clock pins and/or ports (e.g., removing the pins and/or ports from a netlist representing the current state of the integrated circuit design), thereby reducing user error from these manual steps and thereby shortening the turnaround time for completing the design planning phase. In more detail, the computer system stores or caches pin placement information in association with each clock network computed for each clock signal and uses the cached information associated with each clock signal to identify the pins that are to be removed from the design.

As shown in FIG. 1, when performing an iteration of the clock tree planning process after completing an initial full clock tree pin-placement engine step at 120, the computer system detects, at 150, whether the current representation of the integrated circuit design (e.g., the netlist) contains an existing pin placement for the selected clock. In some embodiments, the presence of the previous pin placement is detected based on identifying pins that are present in the netlist that are also stored in a cached list, database, or other collection of clock pins (e.g., feedthrough pins) that were placed during previous runs of the pin-placement engine. If any such pins are detected, then the computer system automatically removes the existing pin placements for the selected clock or clocks that are being updated during the current iteration at 155. After removing the existing pin placements, the netlist is restored to a state in which a pin topology can be generated for the current netlist at 160, subject to the constraints set at 130.

Optionally, at 170, the computer system determines whether the pin topology generated at 160 is approved. In some embodiments, the generated pin topology is presented to an engineer or other user to evaluate the pin topology and to approve or deny approval (or reject) of the generated pin topology. If the pin topology is denied (not approved or rejected), then the computer system returns to set new constraints for a next iteration at 130. In some embodiments, the determination of approval of the pin topology at 170 is omitted.

If the pin topology is approved, and in embodiments where pin topology approval at 170 is omitted, the computer system determines pin placement at 180 and caches the updated pin placement results in association with corresponding ones of the selected clock signals.

At 190, the computer system determines whether the generated output, e.g., the pin placement results, are approved. As above, in some embodiments, the pin placement results are presented to an engineer or other user to evaluate the pin placement results and to approve or deny approval of the generated pin placement results. In some embodiments, the generated pin placement results are provided to an evaluation algorithm to automatically score the computed clock network (e.g., by estimating the latency, clock skew of the clock network, and number of feedthrough pins) and to approve or deny approval of the pin placement results accordingly (e.g., based on whether the latency and clock skew estimated based on the pin placement results satisfies design requirements regarding parameters such as a threshold maximum clock skew and/or a threshold maximum latency at the sub-circuits that receive the clock signals). If the output pin placement results are denied (not approved), then the computer system returns to set new constraints for a next iteration at 130 (e.g., for an engineer to provide new circuit block/sub-circuit and pin constraints). If the results are approved, the computer system outputs the generated results (e.g., a generated updated netlist with pin placements for the clock network) to be used in a next stage of the design planning workflow, such as for computing timing budgets in a design of an integrated circuit (see, e.g., "budgeting" at 670 in FIG. 6).

A design engineer designing an integrated circuit generally applies a clock tree planner to design an efficient clock distribution plan by iteratively setting different constraints on the sub-circuits (or circuit blocks), pins, and clock tree plan until the clock tree planner outputs a desirable result (e.g., meeting clock skew and clock tree insertion delay or latency requirements). Because the overall runtime of a typical full clock tree planning engine is high (e.g., takes tens of minutes to hours to run on a typical computer system, depending on the complexity of the design), the clock planning stage of an overall design planning workflow may be long, thereby putting a limit on the number of iterations of the clock tree planning algorithm can be run within the scheduled development timeline of the integrated circuit. As such, aspects of embodiments of the present disclosure reduce this runtime, thereby saving computation time and energy used by the computer system and/or allowing additional iterations to be performed within the development timeline, which may allow higher quality solutions (e.g., more efficient clock trees) to be computed by the clock tree planner than would otherwise be possible within the same resource constraints (e.g., computing resource allocation and development time).

Figure 3C:
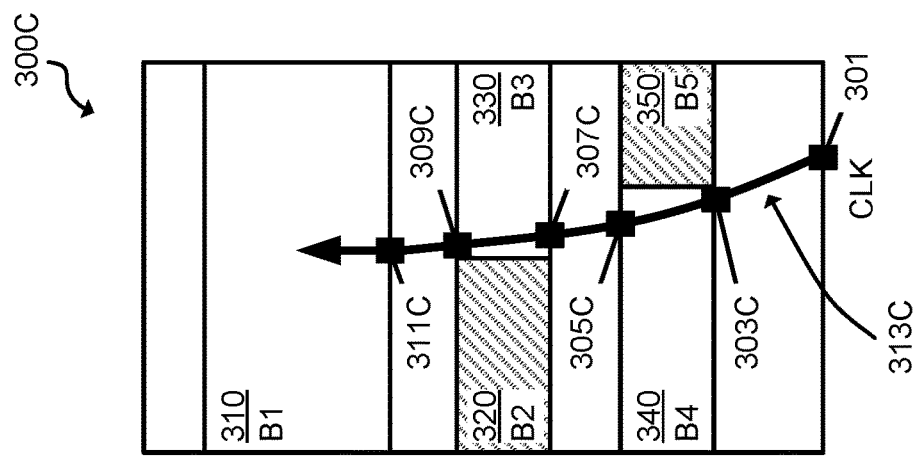
FIG. 3C is a schematic diagram illustrating an integrated circuit design with a single clock and an iteratively-computed updated pin placement after applying a second set of constraints, according to one embodiment of the present disclosure.
Figure 3B:
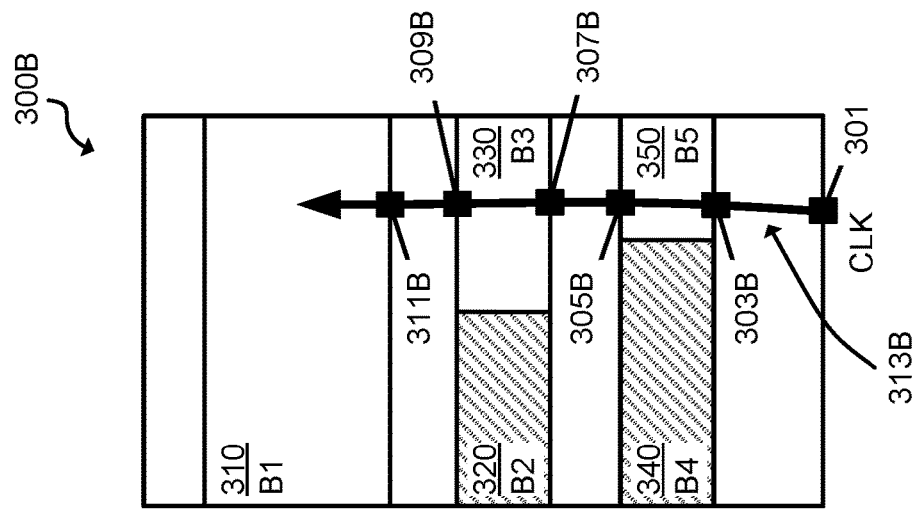
FIG. 3B is a schematic diagram illustrating an integrated circuit design with a single clock and an iteratively-computed updated pin placement after applying a first set of constraints, according to one embodiment of the present disclosure.
Figure 3A:
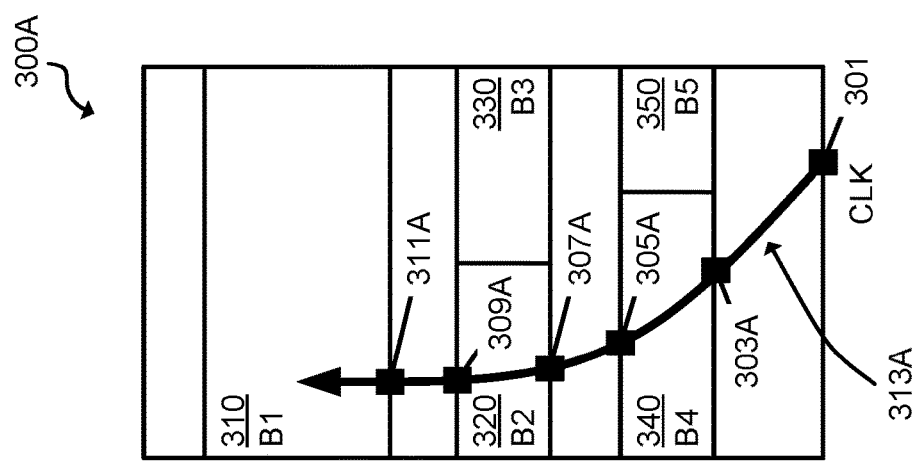
FIG. 3A is a schematic diagram illustrating an integrated circuit design with a single clock and an initial pin placement, according to one embodiment of the present disclosure.

FIGS. 3A, 3B, and 3C provide one example of applying incremental clock tree planning to a design having a single clock. In each of FIGS. 3A, 3B, and 3C, a clock signal CLK is supplied at input clock port 301 and supplied to a leaf first sub-circuit 310 (B1). Second sub-circuit 320 (B2), third sub-circuit 330 (B3), fourth sub-circuit 340 (B4), and fifth sub-circuit 350 (B5) are located between the input clock port 301 and the first sub-circuit 310.

FIG. 3A is a schematic diagram illustrating an integrated circuit design 300A with a single clock and an initial pin placement for an initial clock network 313A. In particular, FIG. 3A may be thought of as a depiction of a netlist corresponding the output of an initial full pin-placer engine at 120 of FIG. 1, in which no initial constraints were supplied. In the arrangement shown in FIG. 3A, the initial full clock tree planning run at 120 distributes the clock as "TOP→B4→B2→B1," and places pins to route the clock network 313A through first and second feedthrough pins 303A and 305A to feed through the lower and upper sides of the fourth sub-circuit 340 respectively, and places third and fourth feedthrough pins 307A and 309A to feed through the lower and upper sides of second sub-circuit 320 respectively to reach the input clock port 311A of the first sub-circuit 310 to arrive at an initial design 300A.

However, the clock network 313A shown in FIG. 3A may score poorly on factors such as clock skew (e.g., because the input clock port 311A is located near the left side of the first sub-circuit 310, which may result in high clock skew across different portions of the first sub-circuit 310) and clock net length (e.g., because the diagonal path of the clock tree may be longer than necessary, thereby increasing latency or clock tree insertion delay).

Accordingly, another iteration of the clock tree planning algorithm may be run with pin, circuit block (sub-circuit), and/or clock tree planning constraints may be set at 130, such as to disable the feedthrough cutting through some sub-circuits.

FIG. 3B is a schematic diagram illustrating an integrated circuit design 300B with a single clock and an iteratively-computed updated pin placement after applying a first set of constraints according to one embodiment of the present disclosure. As shown in FIG. 3B, constraints to disable feedthrough cutting through second sub-circuit 320 (B2) and fourth sub-circuit 340 (B4) are set at 130 of FIG. 1, as indicated by the shaded regions in FIG. 3B. The constraints may be set by an engineer providing additional constraints or may be automatically set by the computer system algorithmically to search the space of possible constraints. In some embodiments, the algorithmic search through the space of constraints is performed by an iterative brute-force trial of all possible constraints. In some embodiments, each possible constraints is assigned a cost (e.g., each sub-circuit and/or each side of each sub-circuit is associated with a cost of adding feedthrough pins on a given side), and the space of possible constraints is searched starting with lowest cost sets of constraints and progressing toward sets of constraints with higher costs.

After setting constraints at 130, the computer system builds a clock tree graph at 140 by loading the initial clock tree graph from the cache (e.g., the initial clock tree graph generated during the full run at 120, which distributes the clock as "TOP→B1"), where the generated clock tree graph is distributed as "TOP→B5→B3→B1." At 150, the computer system detects that the netlist includes the previous pin placement results and, at 155, removes the pin placements 303A, 305A, 307A, and 309A associated with the initial clock network 313A of the clock CLK (e.g., as identified by data cached during the full pin placement engine step at 120 and/or during incremental runs of the pin placement engine at 180), and also un-places the input clock port 311A of the first sub-circuit 310. At 160, the computer system generates a new pin topology based on the constraints and, at 180, places feedthrough pins in accordance with the constraints, thereby placing first and second feedthrough pins 303B and 305B to feed through the lower and upper sides of the fifth sub-circuit 350 respectively, and places third and fourth feedthrough pins 307B and 309B to feed through the lower and upper sides of third sub-circuit 330 respectively to reach the input clock port 311B of the first sub-circuit 310 to arrive at a first iteration of the design 300B, thereby generating a second clock network 313B that connects the input clock port 301 to the first sub-circuit 310.

While the clock network 313B shown in the first iteration of the design of 300B is an improvement over the clock tree shown in the initial design of 300A, such as by virtue of the shorter clock net length (e.g., lower latency or shorter clock tree insertion delay), the present system may improve the first iteration of the design 300B based on a different set of constraints.

FIG. 3C is a schematic diagram illustrating an integrated circuit design with a single clock and an iteratively-computed updated pin placement after applying a second set of constraints according to one embodiment of the present disclosure. In particular, FIG. 3C shows a case where a second incremental CTP run is performed with constraints disabling feedthrough cutting through the second sub-circuit 320 and the fifth sub-circuit 350.

In a manner similar to that described above, after setting the new constraints at 130, the computer system constructs a new clock tree graph at 140, again based on the initial clock tree graph (e.g., "TOP→B1") loaded from the cache, where the new clock tree graph is "TOP→B4→B3→B1." As discussed above, the previous pin placements from the second clock network 313B may be removed (e.g., 303B, 305B, 307B, 309B, and 311B, if starting from the netlist corresponding to the first iteration of the design 300B) the pin topology and pin placement engines are executed based on the new constraints. As such, at 160, the computer system generates a new pin topology based on the constraints and, at 180, places feedthrough pins in accordance with the constraints, thereby placing first and second feedthrough pins 303C and 305C to feed through the lower and upper sides of the fourth sub-circuit 340 respectively, and places third and fourth feedthrough pins 307C and 309C to feed through the lower and upper sides of third sub-circuit 330 respectively to reach the input clock port 311C of the first sub-circuit 310 to arrive at a third clock network 313C of a second iteration of the design 300C. The third clock network 313C shown in the second iteration of the design 300C of FIG. 3C has a slightly longer clock net length than the first iteration 300B (therefore having slightly higher latency or clock tree insertion delay), but also places the input clock port 311C near the center of the bottom edge of the first sub-circuit 310, thereby improving clock skew.

Many integrated circuit designs include multiple clocks to improve their performance. The frequencies of these clocks are determined based on their respective functionalities, and the priority of clocks is generally determined based on their operating frequencies, where high frequency clocks generally have higher priority compared to lower frequency clocks (e.g., because sub-circuits operating on lower frequency clocks are generally more tolerant to clock skew and latency or clock tree insertion delay). In addition, functional clocks have higher frequency compared to test clocks present in the design. As such, a clock tree planner typically distributes functional clocks in a manner that increases the efficiency of those clocks (e.g., minimizes clock skew and latency) compared to test clocks and during clock planning stage user gives higher precedence to these clocks over low important clocks (e.g., sacrifices the performance of lower frequency clocks or test clocks to improve the performance of higher frequency clocks or functional clocks).

Figure 4A:
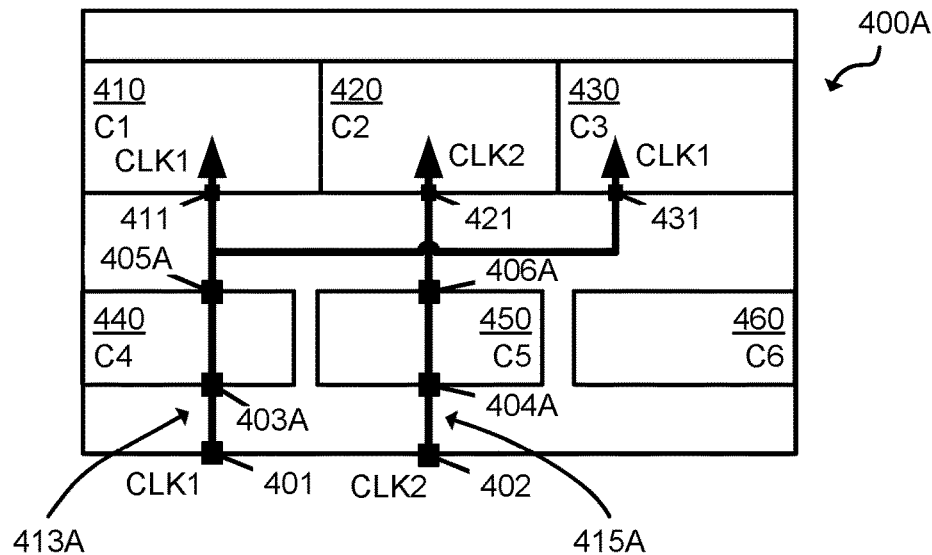
FIG. 4A is a schematic diagram illustrating an integrated circuit design with a first clock and a second clock and an initial pin placement, according to one embodiment of the present disclosure.
Figure 4B:
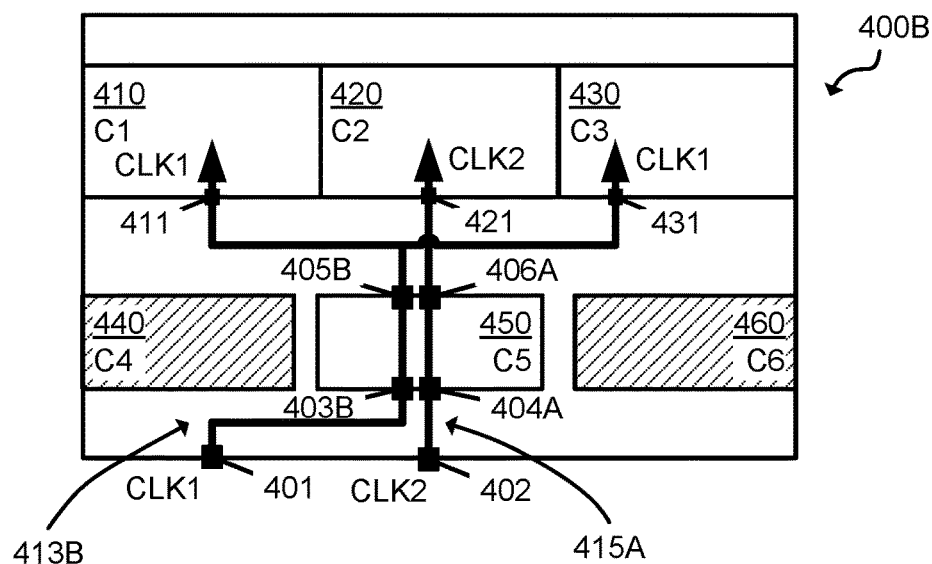
FIG. 4B is a schematic diagram illustrating an integrated circuit design with a single clock and an iteratively-computed updated pin placement for the first clock after applying a first set of constraints, according to one embodiment of the present disclosure.
Figure 4C:
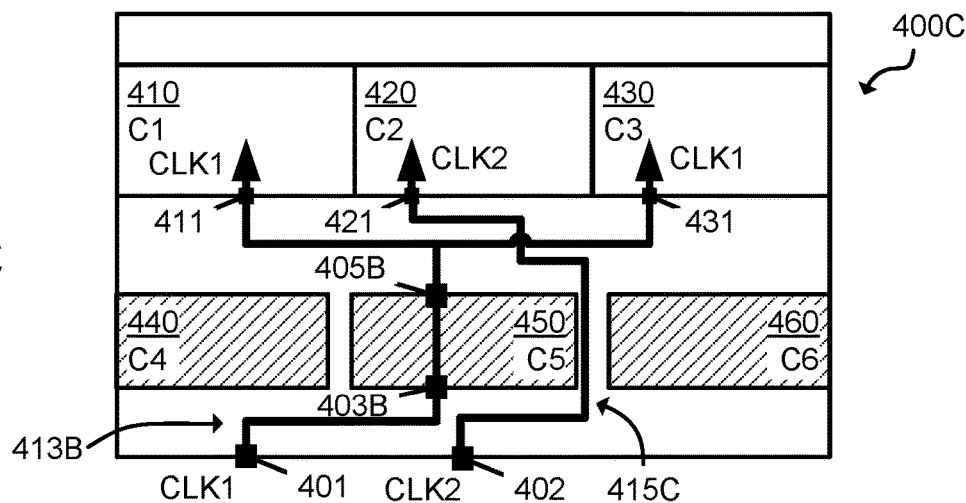
FIG. 4C is a schematic diagram illustrating an integrated circuit design with a single clock and an iteratively-computed updated pin placement for the second clock after applying a second set of constraints, according to one embodiment of the present disclosure.

FIGS. 4A, 4B, and 4C provide one example of applying the present incremental clock tree planning system to an integrated circuit design having multiple clocks. In each of FIGS. 4A, 4B, and 4C a first clock signal CLK1 is supplied at first clock input port 401 a second clock signal CLK2 is supplied at a second clock input port 402. The first clock signal CLK1 is supplied to a leaf first sub-circuit 410 (C1) and a leaf third sub-circuit 430 (C3). The second clock signal CLK2 is supplied to a second leaf sub-circuit 420 (C2). A fourth sub-circuit 440 (C4), a fifth sub-circuit 450 (C5), and a sixth sub-circuit 460 (C6) are located between the clock input ports 401 and 402 and the first, second, and third leaf sub-circuits 410, 420, and 430. For the sake of this example, the first clock signal CLK1 is assumed to be a functional clock (e.g., having a higher frequency clock signal) and the second clock signal CLK2 is assumed to be a test clock (e.g., having a lower frequency clock signal), and therefore the first clock signal CLK1 will have higher priority than the second clock signal CLK2. As a result, the final design will plan a first clock network to distribute the first clock signal CLK1 in a manner that optimizes factors such as clock net length, clock skew, clock latency, clock congestion, etc., while allowing additional flexibility in a second clock network for the second clock signal CLK2 (e.g., allowing the same factors to have worse performance) to improve the overall performance of the design.

FIG. 4A is a schematic diagram illustrating an integrated circuit design with a first clock and a second clock and an initial pin placement. In particular, FIG. 4A is an example of an initial output by a full CTP engine run (e.g., at 120 of FIG. 1), which generates initial clock networks 413A and 415A for the distribution of the first and second clock signals CLK1 and CLK2. The first clock network 413A for the first clock signal CLK1 passes through fourth sub-circuit 440 at feedthrough pins 403A and 405A. The second clock network 415A for the second clock signal CLK2 passes through fifth sub-circuit 450 at feedthrough pins 404A and 406A. The initial first clock network 413A of the first clock signal CLK1 exhibits high clock skew (e.g., because the path from the first clock input port 401 to the input port 411 of the leaf first sub-circuit 410 is much shorter than the path from the first clock input port 401 to the input port 431 of the leaf third sub-circuit 430). Accordingly, constraints may be set in order to explore other potential shapes for the clock distribution network for the first clock signal CLK1 to obtain more desirable timing results (e.g., lower clock skew).

As noted above, at 130, one or more clocks may be selected for pin topology and pin placement computation during a given iteration. As such, because the first clock signal CLK1 is a higher priority clock than the second clock signal CLK2, the present system may prioritize computing an efficient clock network 413 for the first clock signal CLK1 before computing an improved clock distribution network 415 for the second clock signal CLK2.

FIG. 4B is a schematic diagram illustrating an integrated circuit design with a single clock and an iteratively-computed updated pin placement for the first clock after applying a first set of constraints according to one embodiment of the present disclosure. In particular, it is assumed that first clock signal CLK1 is selected and second clock signal CLK2 is unselected. At 130 of FIG. 1, a constraint may be set to disable feedthrough cutting through sub-circuit 440 (C4) and sub-circuit 460 (C6). The constraints set in this example are shown by the shaded areas of sub-circuit 440 (C4) and sub-circuit 460 (C6) in FIG. 4B. During this iteration, the previously-computed initial clock tree graph is loaded from the cache at 140 and used to construct a new clock tree for the selected first clock signal (e.g., passing through C5 and branching to connect to both C1 and C3). At 150, the computer system detects previous pin placements 403A and 405A for the selected first clock signal CLK1 corresponding to the initial first clock network 413A and, at 155, removes those pin placements associated with the initial first clock network 413A of the selected first clock signal CLK1 (e.g., as identified by data stored in the cache at 180 during the initial full clock tree pin placement run at 120), but does not remove the pin placements 404A and 406A associated with the initial second clock network 415A of the unselected second clock signal CLK2. The computer system then generates the pin topology for the selected first clock signal CLK1 at 160 and runs the pin placement engine to generate pin placement results at 180 and to update the cache with the new pin placement results. FIG. 4B shows the resulting updated pin placements for the first iteration of the first clock network 413B of the updated design 400B, where the first iteration of the first clock network 413B for the first clock signal CLK1 now includes new feedthrough pins 403B and 405B passing through the fifth sub-circuit 450 (C5) before branching to connect to first sub-circuit 410 (C1) and third sub-circuit 430 (C3).

The updated first clock network 413B of the first clock signal CLK1 as shown in the first iteration 400B of FIG. 4B has better clock skew than the initial first clock network 413A of the first clock signal CLK1 as shown in the initial design 400A of FIG. 4A. In particular, in the updated first clock network 413B, the clock net length from the first clock input port 401 to the input port 411 of the leaf first sub-circuit 410 is approximately the same length (or exactly the same length) as the path from the first clock input port 401 to the input port 431 of the leaf third sub-circuit 430, therefore resulting in substantially no clock skew between first sub-circuit 410 and third sub-circuit 430.

As noted above, when computing the first iteration 400B of the design, only the first clock signal CLK1 is selected, and the second clock signal CLK2 is unselected. As a result, the feedthrough pins 404A and 406A of the initial second clock network 415A are not considered or modified during this iteration. In addition, the computer system does not build a new clock tree graph for the second clock signal CLK2 at 140, nor does it compute new pin placements for the second clock network 415A at 180.

After achieving a design of the first clock network 413B with low clock skew, the present system may proceed with determining the second clock network for the second clock signal CLK2. Because the second clock signal CLK2 is a test clock with low frequency (e.g. with a lower priority), timing quality (e.g., latency or clock tree insertion delay) of the second clock network can be sacrificed in order to reduce the cost of extra feedthrough pins on the intervening sub-circuits by preventing feedthrough cutting on the fourth sub-circuit 440 (C4), the fifth sub-circuit 450 (C5), and the sixth sub-circuit 460 (C6). For example, in some embodiments, test clocks are automatically assigned a low priority, and some embodiments automatically limit in the number of sub-circuits that clock networks associated with low priority clocks are permitted to pass through. As additional examples, in some embodiments the networks are connected through less congested areas. and in some embodiments the constraints are set to reduce or minimize the number of feedthrough pins on sub-circuits.

Accordingly, the computer system begins a new iteration at 130, selects the second clock signal CLK2 to be operated on (where the first clock signal CLK1 is now unselected) and sets new constraints that prevent feedthrough cutting on the fourth sub-circuit 440 (C4), the fifth sub-circuit 450 (C5), and the sixth sub-circuit 460 (C6).

At 140, the computer system builds a new clock tree graph for the second clock signal CLK2, e.g., a clock tree graph that connects directly from the input clock port ("TOP") to the second sub-circuit 420 (C2). At 150, the computer system detects the existing pin placements for the second clock network 415A, including existing pin placements of feedthrough pins 404A and 406A in the fifth sub-circuit 450 (C5), and removes these pin placements at 155. At 160, the computer system generates a new pin topology and, at 180, run a new pin placement. Due to the constraints, the computer system constructs a second clock network 415C that does not pass through any of the fourth sub-circuit 440 (C4), the fifth sub-circuit 450 (C5), or the sixth sub-circuit 460 (C6), and instead, takes a path through a gap between the fifth sub-circuit 450 (C5) and the sixth sub-circuit 460 (C6).

FIG. 4C is a schematic diagram illustrating an integrated circuit design with a single clock and an iteratively-computed updated pin placement for the second clock after applying a second set of constraints according to one embodiment of the present disclosure. The constraints that prevent feedthrough cutting on the fourth sub-circuit 440, the fifth sub-circuit 450, and the sixth sub-circuit 460 are indicated by the shading on those corresponding regions. The updated second clock network 415C completes the connection from the second clock input port 402 to the second sub-circuit 420 (C2) without incurring the cost of additional feedthrough pins on any of the fourth sub-circuit 440 (C4), the fifth sub-circuit 450 (C5), or the sixth sub-circuit 460 (C6).

As such, aspects of embodiments of the present disclosure relate to an incremental CTP engine that is configured, at any given iteration of the CTP workflow, to run on a single clock, a subset of clocks, or all clocks present in the design base on their requirements. Intermediate results computed during each iteration are cached and reused from one iteration to the next, thereby reducing or removing the need to repeatedly compute values that remain the same between different iterations. In addition, some aspects of embodiments relate to using the cached information to automatically identify pin placements or other data to be removed at the start of the iteration. In this way, embodiments of the present disclosure reduce the runtime and effort of clock planning stages to achieve optimal clock distribution.

Table 1, below, presents experimental results comparing the runtime of an example of the present incremental CTP engine according to some embodiments of the present disclosure against the runtime of a typical full CTP pin-placer engine. The runtimes were computed based on four different industrial designs (labeled D1, D2, D3, and D4) under the same pin/block/CTP constraints and for all clocks present in the design. As shown in the table, an example of the present incremental CTP according to some embodiments is, on average, about 50% faster than a typical Full CTP engine.

TABLE 1

| Design | Runtime (sec) (Typical Full CTP-Engine) | Runtime (sec) (Example Present Incremental CTP-Engine) | % Improvement |
|---|---|---|---|
| D1 | 3450 | 1316 | 61.9 |
| D2 | 7809 | 3501 | 55.2 |
| D3 | 2014 | 1315 | 34.9 |
| D4 | 946 | 500 | 47.1 |

Therefore, experimental results have shown that the runtime of the present incremental CTP engine is about 50-60% shorter than a typical full pin-placer engine, which performs a full clock tree synthesis during every iteration. The present incremental engine according to embodiments of the present disclosure can also replace a full engine when an engineer is using the present incremental pin-placer engine to generate an improved or optimal pin topology by varying constraints such as clock, pin, circuit block, clock tree planning, and/or timing constraints. Experimental results also show that the present incremental engine according to embodiments of the present disclosure has substantially no impact on overall peak memory usage in the computer system in comparison to a full pin-placer engine.

Figure 5:
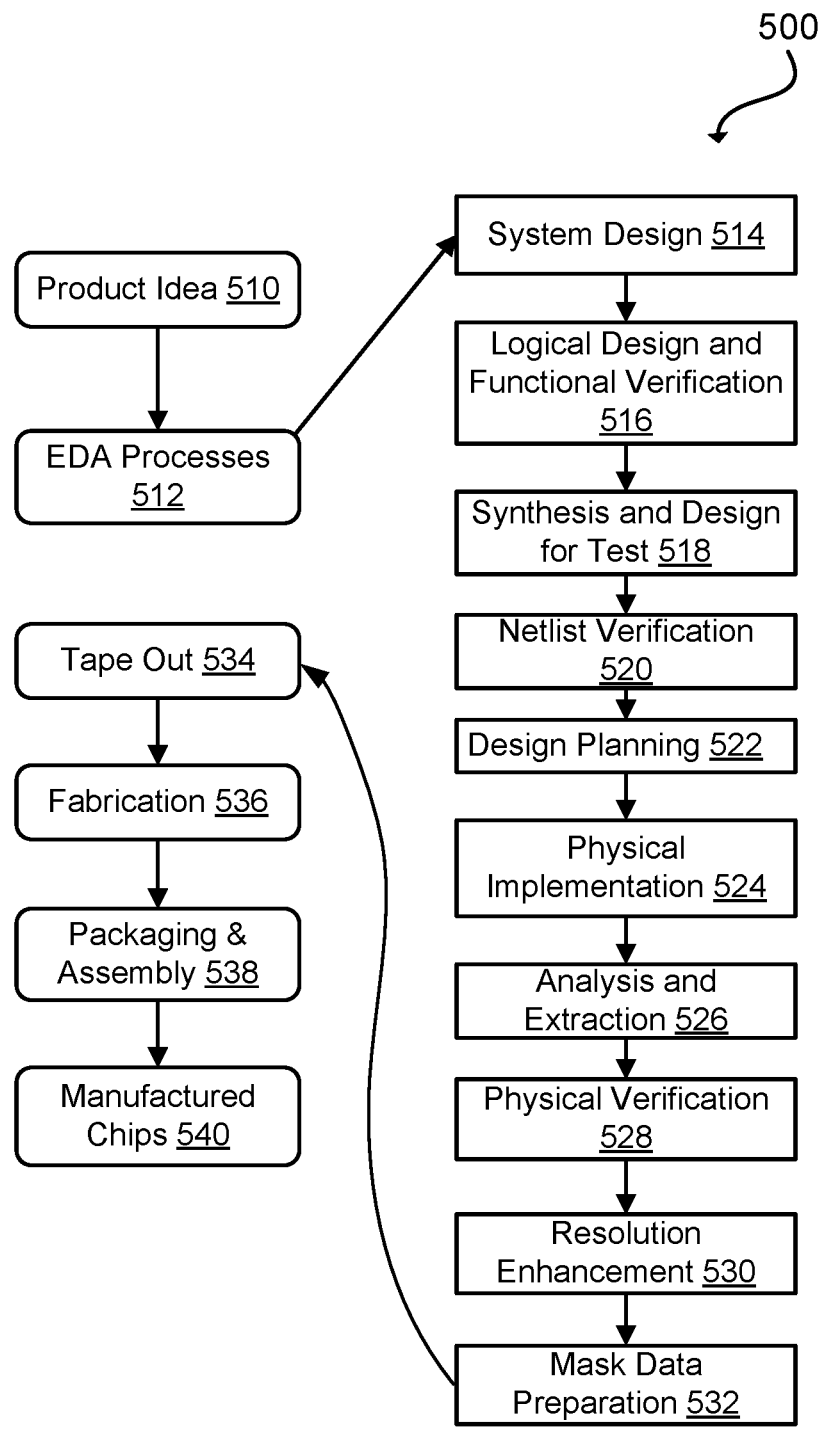
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 5. The processes described by be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 6:
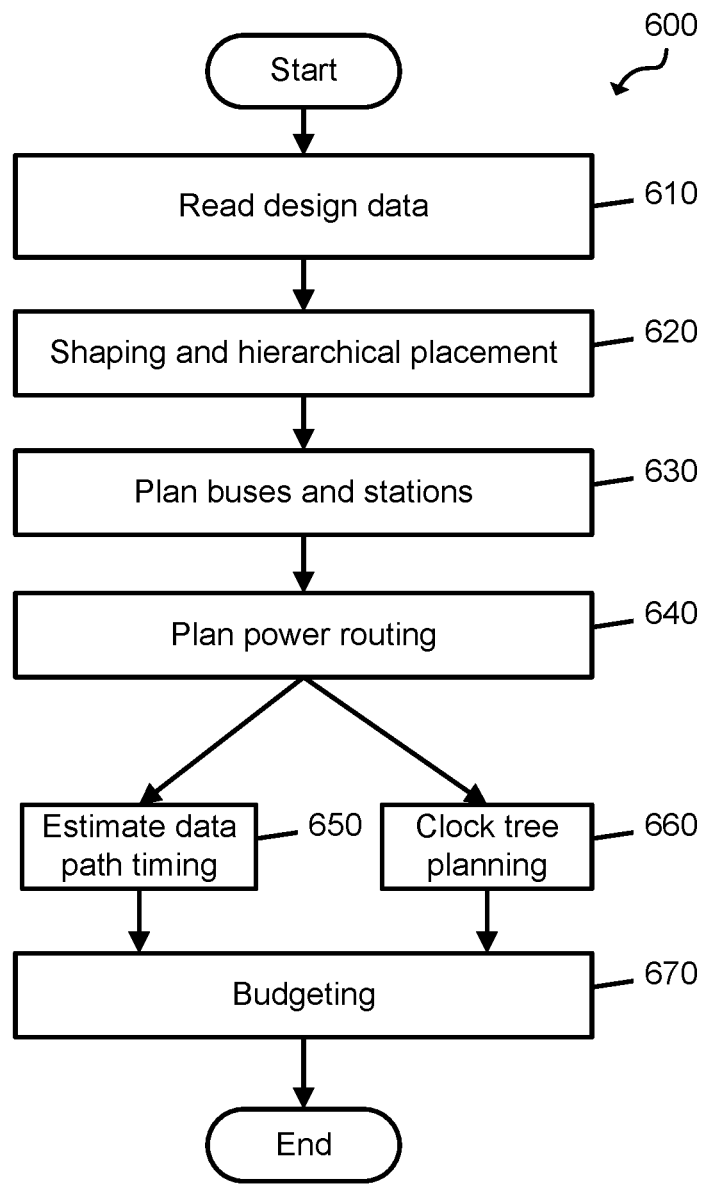
FIG. 6 illustrates an example of generating timing information for budgeting in a design planning workflow for an integrated circuit, including a clock tree planning stage, according to one embodiment of the present disclosure.

FIG. 6 illustrates an example of generating timing information for budgeting in a design planning workflow for an integrated circuit, including a clock tree planning stage. As noted above, during design planning (DP), an overall floor plan for the integrated circuit is constructed and analyzed for timing and top-level routing, before beginning work on implementing the details of the design. Budgeting is one step in the DP flow that involves assigning accurate timing constraints to the sub-designs so that the sub-designs are neither over-constrained nor under-constrained. Referring to FIG. 6, at 610, the computer system reads design data specifying overall parameters for the design of the integrated circuit, including the design characteristics of various sub-circuits (or circuit blocks) of the integrated circuit design. At 620, the computer system arranges the sub-circuits into a hierarchy (e.g., the partitioned smaller sub-circuits within larger sub-circuits of the design) and specifies the shapes of various sub-circuits within the overall floorplan of the integrated circuit. At 630, the computer system plans buses and substations for connecting the sub-circuits. At 640, the computer system plans power routing for supplying power to the sub-circuits within the design. Data path timing is typically estimated and/or predicted by virtual optimization engines at 650 and the post-physical optimization clock latency is predicted by a Clock Tree Planning (CTP) engine at 660. The data path timing and clock tree timing predicted at 650 and 660 are provided for use in budgeting at 670, which computes the timing budgets for the sub-circuits of the design.

Figure 7:
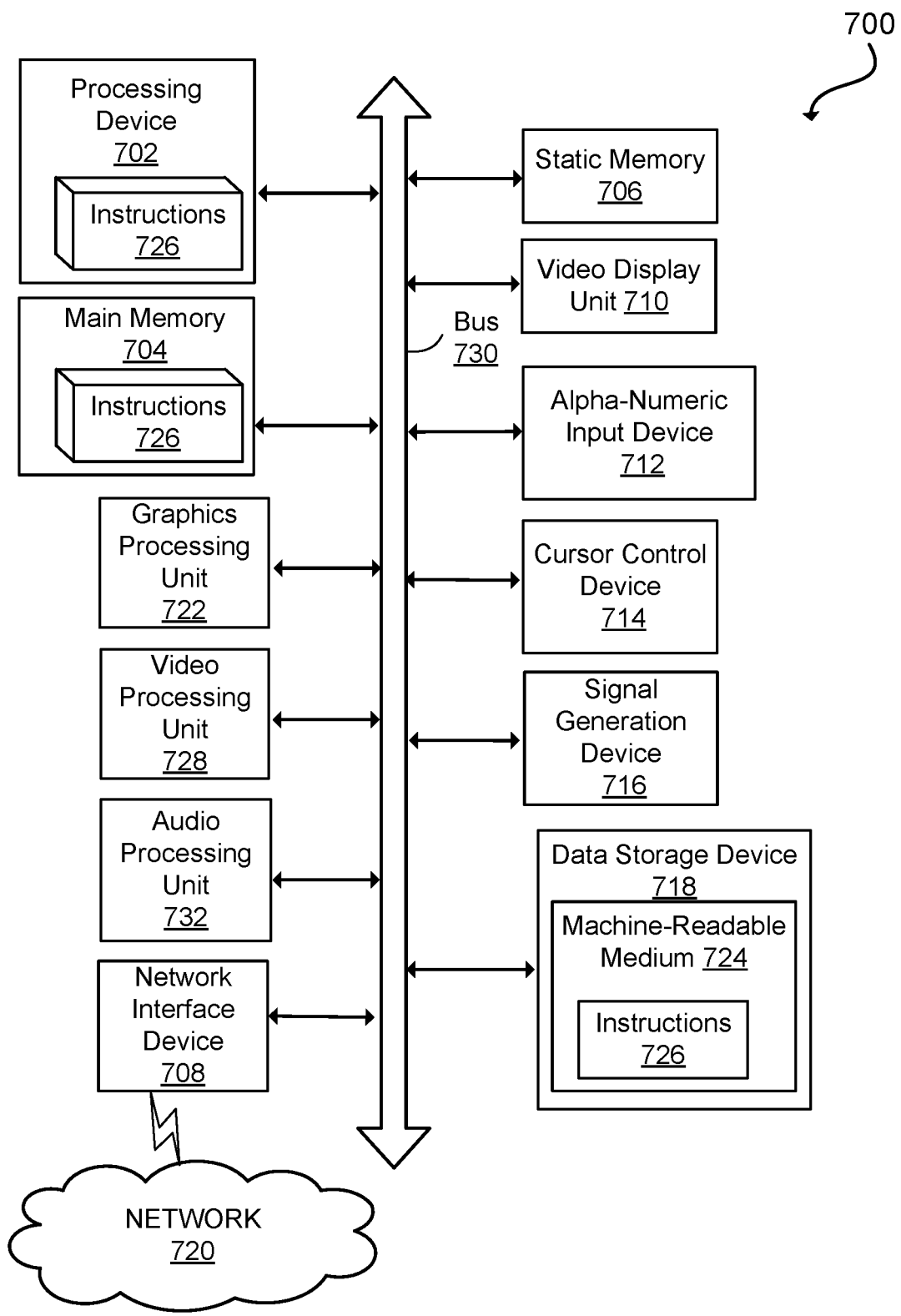
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving an integrated circuit design including a plurality of sub-circuits and one or more clocks to be distributed to the sub-circuits;
   setting one or more constraints on generating a clock network for a selected clock of the one or more clocks of the integrated circuit design;
   building, by a processor, a clock tree graph for the clock network for the selected clock based on a cached initial clock tree graph stored in a memory connected to the processor, the clock tree graph comprising a plurality of nodes corresponding to the sub-circuits of the integrated circuit design;
   generating, a pin topology for the clock network based on the clock tree graph and the integrated circuit design; and
   placing, based on the pin topology, one or more pins for the clock network at one or more sides of the sub-circuits within the integrated circuit design to generate a pin placement for the clock network.

2. The method of claim 1, further comprising computing a full clock tree pin-placement on the integrated circuit design, comprising:
   computing an initial clock tree graph for the one or more clocks of the integrated circuit design and storing the initial clock tree graph as the cached initial clock tree graph in the memory;
   computing an initial pin topology for the one or more clocks of the integrated circuit design and storing the initial pin topology as a cached pin topology in the memory; and
   computing an initial pin placement for the one or more clocks of the integrated circuit design and storing the initial pin placement as a cached pin placement in the memory.

3. The method of claim 2, further comprising storing the pin topology and the pin placement generated for the clock network in the memory.

4. The method of claim 2, further comprising:
  detecting an existing pin placement in the integrated circuit design based on the cached pin placement stored in the memory; and
  removing the existing pin placement from the integrated circuit design based on the cached pin placement stored in the memory.

5. The method of claim 1, wherein the one or more clocks of the integrated circuit design comprise a first clock and a second clock,
  wherein the memory stores a cached initial first clock tree graph and a cached initial second clock tree graph,
  wherein the setting the one or more constraints on generating the clock network for the selected clock of the one or more clocks of the integrated circuit design comprises:
    selecting the first clock as the selected clock and setting the second clock as unselected, and
  wherein the building the clock tree graph for the clock network for the selected clock comprises:
    building a first clock tree graph corresponding to the first clock based on the cached initial first clock tree graph.

6. The method of claim 5, wherein the building the clock tree graph for the clock network for the selected clock comprises building the first clock tree graph corresponding to the first clock without building a second clock tree graph corresponding to the second clock.

7. The method of claim 5, wherein the generating the pin topology for the clock network comprises generating a first pin topology for a first clock network corresponding to the first clock without generating a second pin topology for a second clock network corresponding to the second clock, and
  wherein the placing the one or more pins for the clock network comprises placing one or more first pins for the first clock network corresponding to the first clock without placing one or more second pins for the second clock network corresponding to the second clock.

8. The method of claim 5, further comprising:
  setting one or more second constraints on generating a second clock network for the second clock of the one or more clocks of the integrated circuit design;
  selecting the second clock as the selected clock and setting the first clock as unselected; and
  building, by the processor, a second clock tree graph for the second clock network for the second clock based on the cached initial second clock tree graph, without rebuilding the first clock tree graph.

9. The method of claim 8, further comprising:
  generating a second pin topology for the second clock network without generating a first pin topology for a first clock network; and
  placing one or more second pins for the second clock network without placing one or more first pins for the first clock network.

10. A system comprising:
  a memory storing instructions; and
  a processor, coupled with the memory and to execute the instructions, the instructions when executed cause the processor to:
    set one or more constraints on generating a clock network for a selected clock of one or more clocks of an integrated circuit design including a plurality of sub-circuits, wherein the clock network distributes the one or more clocks to the sub-circuits;
    build a clock tree graph for the clock network for the selected clock based on a cached initial clock tree graph stored in the memory, the clock tree graph comprising a plurality of nodes corresponding to the sub-circuits of the integrated circuit design;
    detect an existing pin placement in the integrated circuit design based on a cached pin placement stored in the memory;
    remove the existing pin placement from the integrated circuit design based on the cached pin placement stored in the memory;
    generate a pin topology for the clock network based on the clock tree graph and the integrated circuit design; and
    place, based on the pin topology, one or more pins for the clock network at one or more sides of the sub-circuits within the integrated circuit design to generate a pin placement for the clock network.

11. The system of claim 10, wherein the memory further stores instructions that, when executed cause the processor to compute a full clock tree pin-placement on the integrated circuit design, comprising:
  computing an initial clock tree graph for the one or more clocks of the integrated circuit design and storing the initial clock tree graph as the cached initial clock tree graph in the memory; and
  computing an initial pin placement for the one or more clocks of the integrated circuit design and storing the initial pin placement as the cached pin placement in the memory.

12. The system of claim 11, wherein the memory further stores instructions that, when executed cause the processor to:
  compute an initial pin topology for the one or more clocks of the integrated circuit design and storing the initial pin topology as a cached pin topology in the memory.

13. The system of claim 10, wherein the one or more clocks of the integrated circuit design comprise a first clock and a second clock,
  wherein the memory stores a cached initial first clock tree graph and a cached initial second clock tree graph,
  wherein the instructions to generate the clock network for the selected clock of the one or more clocks of the integrated circuit design comprise instructions that when executed cause the processor to:
    select the first clock as the selected clock and setting the second clock as unselected, and
  wherein the instructions to build the clock tree graph for the selected clock comprise instructions that when executed cause the processor to:
    build a first clock tree graph corresponding to the first clock based on the cached initial first clock tree graph.

14. The system of claim 13, wherein the instructions to generate the pin topology for the clock network comprises instructions that when executed cause the processor to generate a first pin topology for a first clock network corresponding to the first clock without generating a second pin topology for a second clock network corresponding to the second clock, and
  wherein the instructions to place the one or more pins for the clock network comprise instructions that when executed cause the processor to place one or more first pins for the first clock network corresponding to the first clock without placing one or more second pins for the second clock network corresponding to the second clock.

15. The system of claim 13, wherein the memory further stores instructions that, when executed cause the processor to:
- set one or more second constraints on generating a second clock network for the second clock of the one or more clocks of the integrated circuit design;
- select the second clock as the selected clock and setting the first clock as unselected;
- build a second clock tree graph for the second clock network for the second clock based on the cached initial second clock tree graph, without rebuilding the first clock tree graph;
- generate a second pin topology for the second clock network without generating a first pin topology for a first clock network; and
- place one or more second pins for the second clock network without placing one or more first pins for the first clock network.

16. A non-transitory computer readable medium comprising stored instructions, which when executed by a processor, cause the processor to:
- set one or more constraints on generating a clock network for a selected clock of one or more clocks of an integrated circuit design including a plurality of sub-circuits, wherein the clock network distributes the one or more clocks to the sub-circuits;
- build a clock tree graph for the clock network for the selected clock based on a cached initial clock tree graph stored in memory connected to the processor, the clock tree graph comprising a plurality of nodes corresponding to the sub-circuits of the integrated circuit design;
- remove an existing pin placement from the integrated circuit design based on a cached pin placement stored in the memory;
- generate a pin topology for the clock network based on the clock tree graph and the integrated circuit design; and
- place, based on the pin topology, one or more pins for the clock network at one or more sides of the sub-circuits within the integrated circuit design to generate a pin placement for the clock network.

17. The non-transitory computer readable medium of claim 16, further comprising stored instructions, which when executed by the processor, cause the processor to compute a full clock tree pin-placement on the integrated circuit design, comprising:
- computing an initial clock tree graph for the one or more clocks of the integrated circuit design and storing the initial clock tree graph as the cached initial clock tree graph in the memory;
- computing an initial pin topology for the one or more clocks of the integrated circuit design and storing the initial pin topology as a cached pin topology in the memory; and
- computing an initial pin placement for the one or more clocks of the integrated circuit design and storing the initial pin placement as the cached pin placement in the memory.

18. The non-transitory computer readable medium of claim 17, further comprising stored instructions, which when executed by the processor, cause the processor to:
- detect an existing pin placement in the integrated circuit design based on the cached pin placement stored in the memory.

19. The non-transitory computer readable medium of claim 16, further comprising stored instructions, which when executed by the processor, cause the processor to:
- store a cached initial first clock tree graph and a cached initial second clock tree graph in the memory,
- wherein the instructions to generate the clock network for the selected clock of the one or more clocks of the integrated circuit design comprise instructions that when executed cause the processor to:
  - select a first clock among the one or more clocks of the integrated circuit design as the selected clock and setting a second clock among the one or more clocks of the integrated circuit design as unselected,
- wherein the instructions to build the clock tree graph for the selected clock comprise instructions that when executed cause the processor to:
  - build a first clock tree graph corresponding to the first clock based on the cached initial first clock tree graph,
- wherein the instructions to generate the pin topology for the clock network comprises instructions that when executed cause the processor to:
  - generate a first pin topology for a first clock network corresponding to the first clock, and
- wherein the instructions to place the one or more pins for the clock network comprise instructions that when executed cause the processor to:
  - place one or more first pins for the first clock network corresponding to the first clock.

20. The non-transitory computer readable medium of claim 19, further comprising stored instructions, which when executed by the processor, cause the processor to:
- set one or more second constraints on generating a second clock network for the second clock of the one or more clocks of the integrated circuit design;
- select the second clock as the selected clock and setting the first clock as unselected;
- build a second clock tree graph for the second clock network for the second clock based on the cached initial second clock tree graph, without rebuilding the first clock tree graph;
- generate a second pin topology for the second clock network without regenerating the first pin topology for the first clock network; and
- place one or more second pins for the second clock network without re-placing the one or more first pins for the first clock network.

\* \* \* \* \*